(12) United States Patent
Tech et al.

(10) Patent No.: US 10,341,681 B2
(45) Date of Patent: Jul. 2, 2019

(54) 3D-VIDEO CODEC SUPPORTING INTER-COMPONENT PREDICTION

(71) Applicant: Fraunhofer-Gesellschaft zur Foerderung der angewandten Forschung e.V., Munich (DE)

(72) Inventors: Gerhard Tech, Berlin (DE); Karsten Suehring, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 140 days.

(21) Appl. No.: 15/669,063

(22) Filed: Aug. 4, 2017

(65) Prior Publication Data

US 2018/0027258 A1 Jan. 25, 2018

Related U.S. Application Data

(63) Continuation of application No. PCT/EP2016/052429, filed on Feb. 4, 2016.

(30) Foreign Application Priority Data

Feb. 5, 2015 (EP) .................... 15153900

(51) Int. Cl.
*H04N 19/33* (2014.01)
*H04N 19/597* (2014.01)
(Continued)

(52) U.S. Cl.
CPC ......... *H04N 19/597* (2014.11); *H04N 19/105* (2014.11); *H04N 19/157* (2014.11);
(Continued)

(58) Field of Classification Search
CPC .... H04N 19/597; H04N 19/58; H04N 19/543; H04N 19/54; H04N 19/157; H04N 19/70; H04N 19/105; H04N 19/187
See application file for complete search history.

(56) References Cited

U.S. PATENT DOCUMENTS

2013/0188884 A1* 7/2013 Kim ...................... H04N 19/176
382/233
2014/0341292 A1* 11/2014 Schwarz .............. H04N 19/597
375/240.16
(Continued)

OTHER PUBLICATIONS

Chang (MediaTek Inc.), "3D-HEVC HLS: On inter-component reference pictures", JCT3V-G0048, Joint Collaborative Team on 3D Video Coding Extensions of ITU-T SG 16 WP 3 and ISO/IEC JTC 1/SC 29/WG 11, 7th Meeting: San Jose, US, Jan. 11-17, 2014, 9 pages.

(Continued)

*Primary Examiner* — Howard D Brown, Jr.
(74) *Attorney, Agent, or Firm* — Perkins Coie LLP; Michael A. Glenn

(57) ABSTRACT

3D video coding/decoding supporting inter-component prediction is made operatable with respect to a broader range of settings with respect to accompanying individual views with depth and deactivation/enablement of inter-component prediction, by using one or more flags in the data stream to control the enablement/disablement of the availability of inter-component prediction for coding units of a current picture.

47 Claims, 26 Drawing Sheets

(51) Int. Cl.
*H04N 19/105* (2014.01)
*H04N 19/70* (2014.01)
*H04N 19/157* (2014.01)
*H04N 19/187* (2014.01)
*H04N 19/54* (2014.01)
*H04N 19/543* (2014.01)
*H04N 19/58* (2014.01)

(52) U.S. Cl.
CPC ........... *H04N 19/187* (2014.11); *H04N 19/54* (2014.11); *H04N 19/543* (2014.11); *H04N 19/58* (2014.11); *H04N 19/70* (2014.11)

(56) References Cited

U.S. PATENT DOCUMENTS

| | | | | |
|---|---|---|---|---|
| 2015/0016503 A1* | 1/2015 | Rapaka | .................. | H04N 19/70 375/240.02 |
| 2015/0085929 A1* | 3/2015 | Chen | .................... | H04N 19/597 375/240.13 |
| 2015/0085935 A1* | 3/2015 | Chen | .................... | H04N 19/597 375/240.16 |
| 2016/0044327 A1* | 2/2016 | Kim | ....................... | H04N 19/44 382/233 |
| 2016/0057441 A1* | 2/2016 | Skupin | ................. | H04N 19/137 375/240.25 |

OTHER PUBLICATIONS

Hannuksela (Nokia Corporation), "3DV-ATM HP/EHP high-level syntax: slice header prediction", 100. MPEG Meeting, Geneva, Switzerland ; Motion Picture Expert Group or ISO/IEC JTC1/SC29/WG11, MPEG2012/M24891, Apr. 26, 2012, pp. 1-6.

Rusanovskyy (Nokia Corporation), et al., "Suggestion for a depth-enhanced multiview video coding extension to H.264, Annex A: Nokia 3DV Test Model (3DV-TM) Codec Description and Simulation Results", 43. VCEG Meeting; 97. MPEG Meeting; Jul. 17-22, 2011; Torino; (Video coding experts group of ITU_T SG.16), No. VCEG-AR14 ; Feb. 7, 2012, pp. 1-14.

Tech et al., "3D-HEVC Draft Text 6", JCT3V-J1001, Joint Collaborative Team on 3D Video Coding Extensions of ITU-T G 16 WP 3 and ISO/IEC JTC 1/SC 29/WG 11 10th Meeting: Strasbourg, FR, Oct. 18-24, 2014, 99 pages.

Tech et al. (Fraunhofer HHI), "Proposed HLS Cleanup for 3D-HEVC", 11. JCT-3V Meeting; Geneva; (The Joint Collaborative team on 3D video Coding Extension Development of ISO/IEC JTC1/SC29/WG11 and ITU-T SG.16); URL: http://phenix.int-evry.fr/JCT2/, Document: JCT3V-K0050_v1, Feb. 12-18, 2015, pp. 1-17.

* cited by examiner

| | Descriptor |
|---|---|
| cu_extension( x0, y0, log2CbSize ) { | |
|   if( skip_intra_flag[ x0 ][ y0 ]) | |
|     skip_intra_mode_idx[ x0 ][ y0 ] | ae(v) |
|   else { | |
|     DbbpEnabledFlag == dbbp_enabled_flag[ DepthFlag ] && in_comp_pred_flag | |
|     if( !cu_skip_flag[ x0 ][ y0 ]) { | |
|       if( DbbpEnabledFlag && DispAvailFlag && log2CbSize > 3 && | |
|       ( PartMode == PART_2NxN || PartMode == PART_Nx2N )) | |
|         dbbp_flag[ x0 ][ y0 ] | ae(v) |
|       if(( CuPredMode[ x0 ][ y0 ] ==MODE_INTRA ? IntraDcOnlyWedgeEnabledFlag : | |
|       InterDcOnlyEnabledFlag ) && PartMode == PART_2Nx2N ) | |
|         dc_only_flag[ x0 ][ y0 ] | ae(v) |
|     } | |
|     if( CuPredMode[ x0 ][ y0 ] != MODE_INTRA && PartMode == PART_2Nx2N ) { | |
|       if( IvResPredEnabledFlag && RpRefPicAvailFlag ) | |
|         iv_res_pred_weight_idx[ x0 ][ y0 ] | ae(v) |
|       if( !slice_ic_enabled_flag && icCuEnabledFlag && | |
|       iv_res_pred_weight_idx[ x0 ][ y0 ] == 0 ) | |
|         illu_comp_flag[ x0 ][ y0 ] | ae(v) |
|     } | |
|   } | |
| } | |

| slice_segment_header( ) { | Descriptor |
|---|---|
| first_slice_segment_in_pic_flag | u(1) |
| ... | |
| if( inCompPredAvailFlag ) | |
|   in_comp_pred_flag | u(1) |

80 → in_comp_pred_flag — dependent on dbbp_enabled_flag

Fig. 11b

| sps_3d_extension( ) { | Descriptor |
|---|---|
| for( d=0;d <= 1; d++ ) { | |
| ... | |
|   dbbp_enabled_flag[ d ] | u(1) |

84 → dbbp_enabled_flag[ d ]

Fig. 11c

* Depth layers included in the views, which also include the TRL cPic.
Hence, depth layers in views included in CompRefViewIdcs.

General slice segment header syntax

| slice_segment_header( ) { | Descriptor |
|---|---|
| ... | |
|     inter_layer_pred_layer_idc[ i ] | u(v) |
|   } | |
|  } | |
| if( inCompPredFlag ) | |
|    in_comp_pred_flag | u(1) |
| if( sample_adaptive_offset_enabled_flag ) { | |
|    slice_sao_luma_flag | u(1) |
|    if( ChromaArrayType != 0 ) | |
| ... | |
| } | |

Fig. 16

The lists inCompRefViewIdcs[ i ], refCompLayerPresent[ i ] and the variable inCompPredFlag are derived as specified in the following:

- ~~The variables depthOfRefViewsAvailFlag and textOfCurViewAvailFlag are set equal to 0 and modified as specified in the following:~~
- If DepthFlag is equal to 0, ~~depthOfRefViewsAvailFlag is set equal to 1 and~~ the following applies:
  - For i in the range of 0 to NumRefListLayers[ nuh_layer_id ] - 1, inclusive, the following applies:
    - The variable inCompRefViewIdcs[ i ] is set equal to ViewOrderIdx[ RefPicLayerId[ nuh_layer_id ][ i ] ].
    - The variable refCompLayerPresentFlag[ i ] is set equal to 0.
    - ~~The variable curDepthAvailableFlag is set equal to 0.~~
    - For j in the range of 0 to MaxLayersMinus1, inclusive, the following applies:
      - ~~When all of the following conditions are true, curDepthAvailableFlag is set equal to 1:~~
      - When all of the following conditions are true, refCompLayerPresentFlag[ i ] is set equal to 1.
        - direct_dependency_flag[ LayerIdxInVps[ nuh_layer_id ] ][ j ] is equal to 1
        - VpsDepthFlag[ layer_id_in_nuh[ j ] ] is equal to 1
        - ViewOrderIdx[ layer_id_in_nuh[ j ] ] is equal to ViewOrderIdx[ IdRefListLayer[ nuh_layer_id ][ i ] ]
        - DependencyId[ layer_id_in_nuh[ j ] ] is equal to 0
        - AuxId[ layer_id_in_nuh[ j ] ] is equal to 0
    - ~~When curDepthAvailableFlag is equal to 0, depthOfRefViewsAvailFlag is set equal to 0.~~

Fig. 17a

- The variable depthOfRefViewsAvailFlag is derived as specified in the following:
  - If refCompLayerPresentFlag[ i ] is equal to 1, for all i the range of 0 to NumRefListLayers[ nuh_layer_id ] - 1, inclusive, depthOfRefViewsAvailFlag is set equal to 1.
  - Otherwise, depthOfRefViewsAvailFlag is set equal to 0.
- The variable inCompPredFlag is derived as specified in the following:

inCompPredFlag = depthOfRefViewsAvailFlag && (
  view_synthesis_pred_flag[ DepthFlag ] ||
  depth_based_blk_part_flag[ DepthFlag ] || depth_refinement_flag[ DepthFlag ] )
  (I - 12)

- Otherwise (DepthFlag is equal to 1), the following applies:
  - The variable inCompRefViewIdcs[ 0 ] is set equal to ViewIdx.
  - The variable refCompLayerPresentFlag[ 0 ] is set equal to 0.
  - For j in the range of 0 to MaxLayersMinus1, inclusive, the following applies:
    - When all of the following conditions are true, refCompLayerPresentFlag[ 0 ] is set equal to 1.
    - ~~When all of the following conditions are true, textOfCurViewAvailFlag is set equal to 1:~~
      - direct_dependency_flag[ LayerIdxInVps[ nuh_layer_id ] ][ j ] is equal to 1
      - VpsDepthFlag[ layer_id_in_nuh[ j ] ] equal to 0
      - ViewOrderIdx[ layer_id_in_nuh[ j ] ] equal to ViewIdx
      - DependencyId[ layer_id_in_nuh[ j ] ] is equal to 0
      - AuxId[ layer_id_in_nuh[ j ] ] is equal to 0
  - The variable inCompPredFlag is derived as specified in the following:

inCompPredFlag = refCompLayerPresentFlag[ 0 ] && (
    intra_contour_flag[ DepthFlag ] ||
    qt_pred_flag[ DepthFlag ] || mpi_flag[ DepthFlag ] ) (I- 12)

in_comp_pred_flag equal to 0 specifies that reference pictures used for inter-component prediction of the current picture might not be present and that inter-component prediction of the current picture is disabled. in_comp_pred_flag[ i ] equal to 1 specifies all reference pictures used for inter-component prediction of the current picture are present and inter-component prediction of the current picture is enabled. When not present, in_comp_pred_flag is inferred to be equal to 0.

Fig. 17b

When in_comp_pred_flag is equal to 1, the following applies for i in the range of 0 to ( DepthFlag ? 0 : NumRefListLayers[ nuh_layer_id ] - 1 ), inclusive:
- It is a requirement of bitstream conformance that there is a picture in the DPB with PicOrderCntVal equal to the PicOrderCntVal of the current picture, and a nuh_layer_id value refNuhLayerId such that VpsDepthFlag[ refNuhLayerId ] not equal to DepthFlag, ViewOrderIdx[ refNuhLayerId ] is equal to inCompRefViewIdcs[ i ], DependencyId[ refNuhLayerId ] is equal to DependencyId[ nuh_layer_id ], and AuxId[ refNuhLayerId ] is equal to AuxId[ nuh_layer_id ].

ViewSynthesisPredFlag = ( nuh_layer_id > 0 ) && NumRefListLayers[ nuh_layer_id ] > 0 && view_synthesis_pred_flag[ DepthFlag ] && in_comp_pred_flag~~depthOfRefViewsAvailFlag~~

(I- 16)

DepthBasedBlkPartFlag = ( nuh_layer_id > 0 ) && depth_based_blk_part_flag[ DepthFlag ] && in_comp_pred_flag~~depthOfRefViewsAvailFlag~~

(I- 17)

DepthRefinementFlag = ( nuh_layer_id > 0 ) && 
   depth_refinement_flag[ DepthFlag ] && in_comp_pred_flag~~depthOfRefViewsAvailFlag~~

(I- 18)

MpiFlag = ( nuh_layer_id > 0 ) && mpi_flag[ DepthFlag ] && in_comp_pred_flag~~textOfCurViewAvailFlag~~  (I- 19)

IntraContourFlag = ( nuh_layer_id > 0 ) && 
   intra_contour_flag[ DepthFlag ] && in_comp_pred_flag~~textOfCurViewAvailFlag~~

(I- 21)

QtPredFlag = ( nuh_layer_id > 0 ) && qt_pred_flag[ DepthFlag ] && in_comp_pred_flag~~textOfCurViewAvailFlag~~         (I- 23)

| slice_segment_header( ) { | Descriptor |
|---|---|
| ... | |
| inter_layer_pred_layer_idc[ i ] | u(v) |
| } | |
| } | |
| if( inCompPredFlag ) | |
| for( i = 0; i < NumRefListLayers[ nuh_layer_id ]; i++ ) | |
| if( refCompLayerPresentFlag[ i ] ) | |
| in_comp_pred_flag[ i ] | u(1) |
| if( sample_adaptive_offset_enabled_flag ) { | |
| slice_sao_luma_flag | u(1) |
| if( ChromaArrayType != 0 ) | |
| ... | |
| } | |

Fig. 19

~~The variables depthOfRefViewsAvailFlag and textOfCurViewAvailFlag are set equal to 0 and modified as specified in the following:~~

The lists inCompRefViewIdcs[ i ], refCompLayerPresent[ i ] and the variable inCompPredFlag are derived as specified in the following:

- If DepthFlag is equal to 0, ~~depthOfRefViewsAvailFlag is set equal to 1 and~~ the following applies:
    - For i in the range of 0 to NumRefListLayers[ nuh_layer_id ] - 1, inclusive, the following applies:

Fig. 20a

- ~~The variable curDepthAvailableFlag is set equal to 0.~~
- <u>The variable inCompRefViewIdcs[ i ] is set equal to ViewOrderIdx[ RefPicLayerId[ nuh_layer_id ][ i ] ].</u>
- <u>The variable refCompLayerPresentFlag[ i ] is set equal to 0.</u>
- For j in the range of 0 to MaxLayersMinus1, inclusive, the following applies:
  - ~~When all of the following conditions are true, curDepthAvailableFlag is set equal to 1:~~
  - <u>When all of the following conditions are true, refCompLayerPresentFlag[ i ] is set equal to 1.</u>
    - direct_dependency_flag[ LayerIdxInVps[ nuh_layer_id ] ][ j ] is equal to 1
    - VpsDepthFlag[ layer_id_in_nuh[ j ] ] is equal to 1
    - ViewOrderIdx[ layer_id_in_nuh[ j ] ] is equal to ViewOrderIdx[ IdRefListLayer[ nuh_layer_id ][ i ] ]
    - DependencyId[ layer_id_in_nuh[ j ] ] is equal to 0
    - AuxId[ layer_id_in_nuh[ j ] ] is equal to 0
- ~~When curDepthAvailableFlag is equal to 0, depthOfRefViewsAvailFlag is set equal to 0.~~
- <u>The variable inCompPredFlag is derived as specified in the following:</u>

<u>inCompPredFlag = ( view_synthesis_pred_flag[ DepthFlag ] || depth_based_blk_part_flag[ DepthFlag ] || depth_refinement_flag[ DepthFlag ] )</u>   (I- 12)

- Otherwise (DepthFlag is equal to 1), the following applies:
  - <u>The variable inCompRefViewIdcs[ 0 ] is set equal to ViewIdx.</u>
  - <u>The variable refCompLayerPresentFlag[ 0 ] is set equal to 0.</u>
  - For j in the range of 0 to MaxLayersMinus1, inclusive, the following applies:
    - <u>When all of the following conditions are true, refCompLayerPresentFlag[ 0 ] is set equal to 1.</u>
    - ~~When all of the following conditions are true, textOfCurViewAvailFlag is set equal to 1:~~
      - <u>refCompLayerPresentFlag[ 0 ] is equal to 0.</u>
      - direct_dependency_flag[ LayerIdxInVps[ nuh_layer_id ] ][ j ] is equal to 1
      - VpsDepthFlag[ layer_id_in_nuh[ j ] ] equal to 0

Fig. 20b

- ViewOrderIdx[ layer_id_in_nuh[ j ] ] equal to ViewIdx
- DependencyId[ layer_id_in_nuh[ j ] ] is equal to 0
- AuxId[ layer_id_in_nuh[ j ] ] is equal to 0
- The variable inCompPredFlag is derived as specified in the following:
  inCompPredFlag = intra_contour_flag[ DepthFlag ] ||
          qt_pred_flag[ DepthFlag ] || mpi_flag[ DepthFlag ] )    (I- 12)

in_comp_pred_flag[ i ] equal to 0 specifies that a reference picture of the view with ViewIdx equal to inCompRefViewIdcs[ i ] used for inter-component prediction of the current picture might not be present and that inter-component prediction of the current picture from a reference picture of the view with ViewIdx equal to inCompRefViewIdcs[ i ] is disabled. in_comp_pred_flag[ i ] equal to 1 specifies a reference pictures of the view with ViewIdx equal to inCompRefViewIdcs[ i ] used for inter-component prediction of the current picture is present and inter-component prediction of the current picture from a reference picture of the view with ViewIdx equal to inCompRefViewIdcs[ i ] is enabled. When not present, in_comp_pred_flag[ i ] is inferred to be equal to 0.

The following applies for i in the range of 0 to ( DepthFlag ? 0 : NumRefListLayers[ nuh_layer_id ] - 1 ), inclusive:
- When in_comp_pred_flag[ i ] is equal to 1, it is a requirement of bitstream conformance that there is a picture in the DPB with PicOrderCntVal equal to the PicOrderCntVal of the current picture, and a nuh_layer_id value refNuhLayerId such that VpsDepthFlag[ refNuhLayerId ] not equal to DepthFlag, ViewOrderIdx[ refNuhLayerId ] is equal to inCompRefViewIdcs[ i ], DependencyId[ refNuhLayerId ] is equal to DependencyId[ nuh_layer_id ], and AuxId[ refNuhLayerId ] is equal to AuxId[ nuh_layer_id ].

Fig. 20c

ViewSynthesisPredFlag = ( nuh_layer_id > 0 )  &&  NumRefListLayers[ nuh_layer_id ] > 0 &&
      view_synthesis_pred_flag[ DepthFlag ] ~~&& depthOfRefViewsAvailFlag~~     (I- 16)
DepthBasedBlkPartFlag = ( nuh_layer_id > 0 )  &&
      depth_based_blk_part_flag[ DepthFlag ] ~~&& depthOfRefViewsAvailFlag~~ (I- 17)
DepthRefinementFlag = ( nuh_layer_id > 0 )  &&
      depth_refinement_flag[ DepthFlag ] ~~&& depthOfRefViewsAvailFlag~~     (I- 18)
MpiFlag = ( nuh_layer_id > 0 )  &&  mpi_flag[ DepthFlag ]
~~&& textOfCurViewAvailFlag~~                                                                                       (I- 19)
IntraContourFlag = ( nuh_layer_id > 0 )  &&  ————————intra_contour_flag[ DepthFlag ]
~~&& textOfCurViewAvailFlag~~                                                                                        (I- 21)
QtPredFlag = ( nuh_layer_id > 0 )  &&  qt_pred_flag[ DepthFlag ] ~~&&~~
~~textOfCurViewAvailFlag~~ (I- - 23)
...

Let maxViewIdx be the maximum value of ViewIdx of all layers in the bitstream.
For v in the range of 0 to maxViewIdx - 1, inclusive, inCompPredEnabledFlag[ v ] is set equal to 0.

For i in the range of 0 to ( DepthFlag ? 0 : NumRefListLayers[ nuh_layer_id ] - 1 ), inclusive, when in_comp_pred_flag[ i ] is equal to 1, inCompPredEnabledFlag[ inCompRefViewIdcs[ i ] ] is set equal to 1.

At CU level a particular tool using inter-component prediction from a particular reference picture of a view with ViewIdxA is disabled when one or more of the following conditions is true:
- inCompPredEnabledFlag[ ViewIdxA ] is equal to 0.
- the corresponding slice level tool enabling flag is equal to 0. (e.g., MpiFlag for MPI)

Disabling is either directly done by testing both conditions or indirectly by involving a potential tool enabling flag parsed from the CU to be equal to 0.

Fig. 21

3D-VIDEO CODEC SUPPORTING INTER-COMPONENT PREDICTION

CROSS-REFERENCE TO RELATED APPLICATIONS

This application is a continuation of copending International Application No. PCT/EP2016/052429, filed Feb. 4, 2016, which claims priority from European Application No. EP 15 153 900.4, filed Feb. 5, 2015, which are each incorporated herein in its entirety by this reference thereto.

The present application is concerned with 3D-video coding/decoding supporting inter-component prediction.

BACKGROUND OF THE INVENTION

In the current design of 3D-HEVC, when decoding a current picture, several new 3D-HEVC tools refer to pictures, which a) belong to a component different from the component of the current picture (where a component can be texture or depth); b) are included in the same access unit (AU) (where an AU contains all pictures of the same time instant with equal picture order count); and are c) not in the reference picture list of the current picture. More specifically:

1. When decoding a current depth picture, some tools refer to the texture reference pictures belonging to the same view and AU as the depth picture. Thus, the current component is depth and the reference component is texture.

2. When decoding a texture picture, some tools refer to the depth pictures belonging to the views of the texture reference pictures of the current texture picture and the AU of the current texture picture. Thus, the current component is texture and the reference component is depth.

See Example 1 in FIG. 1, which illustrates the inter-component prediction from depth to texture. FIG. 1 depicts a subset of layers of a 3D-HEVC multilayer bitstream and inter-component dependencies of a current picture. The current picture is picture 1 of layer 6. The current component is texture and the reference component is depth. The parameters sets SPS, VPS; pictures 0 of layers 1, 3, 5 and 6; pictures 1 of layers 1, 3, and 5; and the slice header of the current picture are decoded before decoding any coding units (CUs) of the current picture. When CU 0, CU1, and CU 2 of the current picture are decoded, inter-component prediction from pictures 1 of depth layers of views 2, 0, and 1, respectively, is performed.

In the current design tools using inter-component prediction are enabled or disabled for the current picture as follows:

If the current picture is a depth picture, the reference component is texture. Otherwise (the current picture is a texture picture), the reference component is depth.

Views which might be used for inter-component prediction of the current picture are derived from syntax elements in the VPS, SPS and the slice header of the current picture. In the following it is assumed that indices of these views are included in the list inCompRefViewIdcs.

If all of the following conditions are true, a particular tool is enabled for the current picture:

For each view i in inCompRefViewIdcs, the following is true:
Syntax elements in the VPS signal that a reference component layer of view i is present in the bitstream and available as reference layer for the layer containing the current picture.

The particular tool using inter-component prediction is enabled for the layer containing the current picture by SPS and/or the VPS enabling flags.

Otherwise, the particular tool using inter-component prediction is disabled for current picture.

As an Example 2, see again FIG. 1: views that might be used for inter-component prediction from depth are derived as inCompRefViewIdcs={2, 1, 0}. For all views a depth layer is present in the bitstream, such that tools using inter-component from depth can be enabled for all CUs (0, 1 and 2) of the current picture.

The current method for enabling inter-component prediction has two issues:

First issue: The presence a reference component layer in the bitstream does not entail the presence of all its pictures. Thus, a particular picture of a present reference component layer can be missing, and inter-component prediction from this picture is still enabled.

See Example 3 in FIG. 2. In FIG. 2, depth layers are present in the bitstream for all views included in inCompRefViewIdcs={2, 1, 0}, such that inter-component prediction from depth is enabled for all CUs of the current layer. However, inter-component prediction for CU 1 in the current picture fails, since picture 1 of the depth layer of view 0 is missing.

Second issue: Not all reference component layers of views in inCompRefViewIdcs are included in the bitstream, such that inter-component prediction is disabled for all CUs of the current picture. However, inter-component could be applied for CUs of the current picture which refer the present pictures of reference component layers.

See Example 4 in FIG. 3. In FIG. 3, the depth layer of view 0 is not included in the bitstream.

Hence, not all depth layers of views included in inCompRefViewIdcs={2, 1, 0} are present in the bitstream, such that inter-component prediction is disabled for all CUs of the current picture. However, inter-component prediction from the depth layer of view 2 and the depth layer of view 1 for CU 0 and CU 2, respectively, could be applied.

The above issues may naturally also occur in 3D video codecs other than 3D-HEVC. Accordingly, there is a need for a 3D video codec supporting inter-component prediction which operates correctly in a wider range of possible settings accompanying the individual views with depth on the one and the enablement of inter-component prediction on the other hand.

SUMMARY

According to an embodiment, a 3D video decoder may have: a video decoding core configured to decode a sequence of layers of a video from a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, an inter-component prediction switch configured to read a first parameter set from the data stream, the first parameter set relating to a temporal portion of the video relating to a timestamp of a current picture, and derive therefrom, for a current picture of a current layer which represents texture, a texture reference layer set of layers representing texture, read a second parameter set from the data stream, the second parameter set relating to the current picture or a portion of the current picture, and derive therefrom, for coding units within the current picture or the portion of the current picture, a selected texture reference layer set of layers representing texture from the texture reference layer set, if an intersection of a potentially available set of layers representing depth of views the texture of which is represented by any of the selected texture reference layer set, on the one hand and a depth reference layer set of layers representing depth determined by the first parameter set, on the other hand equals the potentially available set, then read a flag from the data stream, the flag relating to the current picture or the portion of the current picture and indicating whether the depth-to-texture prediction is enabled or disabled for the coding units within the current picture or the portion of the current picture, and if the intersection is unequal to the potentially available set, then infer the flag relating to the coding units within the current picture or the portion of the current picture as indicating that the depth-to-texture prediction is disabled for the coding units, wherein the video decoding core is configured to be responsive to the flag in order to, depending on the flag, apply or not apply depth-to-texture prediction for a current coding unit among the coding units within the current picture or the portion of the current picture.

According to another embodiment, a 3D video encoder may have: a video encoding core configured to encode a sequence of layers of a video into a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, an inter-component prediction switch configured to insert a first parameter set into the data stream, the first parameter set relating to a temporal portion of the video relating to a timestamp of a current picture, and indicating, for a current picture of a current layer which represents texture, a texture reference layer set of layers representing texture and a depth reference layer set of layers representing depth, insert a second parameter set into the data stream, the second parameter set relating to the current picture or a portion of the current picture, and indicating, for coding units within the current picture or a portion of the current picture, a selected texture reference layer set of layers representing texture from the texture reference layer set, if an intersection of a potentially available set of layers representing depth of views the texture of which is represented by any of the selected texture reference layer set, on the one hand and the depth reference layer set, on the other hand, equals the potentially available set, then deciding whether the depth-to-texture prediction is enabled or disabled for the current picture or the portion of the picture and inserting a flag into the data stream, the flag relating to the current picture or portion of the current picture and indicating whether the depth-to-texture prediction is enabled or disabled for the coding units within the current picture or the portion of the current picture, and if the intersection is unequal to the potentially available set, suppressing inserting the flag relating to the coding units within the current picture or the portion of the current picture and disabling the depth-to-texture prediction for the coding units, wherein the video encoding core is configured to, depending on the depth-to-texture prediction being enabled or disabled for the current coding unit, apply or not apply depth-to-texture prediction for a current coding unit among the coding units within the current picture or the portion of the current picture.

According to another embodiment, a 3D video decoder may have: a video decoding core configured to decode a sequence of layers of a video from a data stream using intra-layer prediction, each layer representing depth or texture of a respective one of a plurality of views, the video decoding core supporting, for a layer representing depth of a current view, prediction from layers representing depth of a different view and texture-to-depth prediction from a layer representing texture, an inter-component prediction switch configured to read a first parameter set from the data stream, the first parameter set relating to a temporal portion of the video relating to a timestamp of a current picture of the layer representing depth of the current view, if an intersection of a potentially available set of one or more layers representing texture of one or more views the depth of which is represented by the layer representing depth of the current view, on the one hand and a texture reference layer set of layers representing texture determined by the first parameter set, on the other hand equals the potentially available set, read a flag from the data stream, the flag relating to the current picture or a portion of the current picture and indicating whether the texture-to-depth prediction is enabled or disabled for the coding units within the current picture or the portion of the current picture, if the intersection is unequal to the potentially available set, then infer the flag relating to the coding units within the current picture or the portion of the current picture as indicating that the texture-to-depth prediction is disabled for the coding units, wherein the video decoding core is configured to be responsive to the flag in order to, depending on the flag, apply or not apply texture-to-depth prediction for a current coding unit among the coding units within the current picture or the portion of the current picture.

According to another embodiment, a 3D video encoder may have: a video encoding core configured to encode a sequence of layers of a video into a data stream using intra-layer prediction, each layer representing depth or texture of a respective one of a plurality of views, the video decoding core supporting, for layers representing depth of a current view, prediction from layers representing depth of a different view and texture-to-depth prediction from a layer representing depth of the current layer, an inter-component prediction switch configured to insert a first parameter set into the data stream, the first parameter set relating to a temporal portion of the video relating to a timestamp of a current picture of the layer representing depth of the current view, and indicating, for the current picture, a texture reference layer set of layers representing texture, if an intersection of a potentially available set of one or more layers representing texture of one or more views the depth of which is represented by the layer representing depth of the current view, on the one hand and the texture reference layer set, on the other hand equals the potentially available set, deciding whether the texture-to-depth prediction is enabled or disabled for the coding units within the current picture or a portion of the current picture, and inserting a flag into the data stream, the flag relating to the current picture or portion of the current picture and indicating whether the texture-to-depth prediction is enabled or disabled for the coding units within the current picture or the portion of the current picture, and wherein the video encoding core is configured to, depending on the depth-to-texture prediction being enabled or disabled for the current coding unit, apply or not apply texture-to-depth prediction for a current coding unit among the coding units within the current picture or the portion of the current picture.

According to another embodiment, a method for 3D video decoding may have the steps of: decoding, performed by a video decoding core, a sequence of layers of a video from a data stream using intra-layer prediction, each layer representing depth or texture of a respective one of a plurality of views, the video decoding core supporting, for layers representing texture, inter-view texture prediction from layers representing texture of a different view, reading a first parameter set from the data stream, the first parameter set relating to a temporal portion of the video relating to a timestamp of a current picture, and derive therefrom, for a current picture of a current layer which represents texture, a texture reference layer set of layers representing texture and a depth reference layer set of layers representing depth, reading a second parameter set from the data stream, the second parameter set relating to the current picture or a portion of the current picture, and derive therefrom, for coding units within the current picture or the portion of the current picture, a selected texture reference layer set of layers representing texture from the texture reference layer set, each layer of the selected texture reference layer set, if an intersection of a potentially available set of layers representing depth of views the texture of which is represented by any of the selected texture reference layer set, on the one hand and a depth reference layer set of layers representing depth determined by the first parameter set, on the other hand equals the potentially available set, then reading a flag from the data stream, the flag relating to the current picture or the portion of the current picture and indicating whether the depth-to-texture prediction is enabled or disabled for the coding units within the current picture or the portion of the current picture, and if the intersection is unequal to the potentially available set, then inferring the flag relating to the coding units within the current picture or the portion of the current picture as indicating that the depth-to-texture prediction is disabled for the coding units, wherein the video decoding core, depending on the flag, applies or not applies depth-to-texture prediction for a current coding unit among the coding units within the current picture or the portion of the current picture.

According to another embodiment, a method for 3D video encoding may have the steps of: encoding, performed by a video encoding core, a sequence of layers of a video into a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, inserting a first parameter set into the data stream, the first parameter set relating to a temporal portion of the video relating to a timestamp of a current picture, and indicating, for a current picture of a current layer which represents texture, a texture reference layer set of layers representing texture and a depth reference layer set of layers relating to depth, inserting a second parameter set into the data stream, the second parameter set relating to the current picture or a portion of the current picture, and indicating, for coding units within the current picture or a portion of the current picture, a selected texture reference layer set of layers representing texture from the texture reference layer set, if an intersection of a potentially available set of layers representing depth of views the texture of which is represented by any of the selected texture reference layer set, on the one hand and the depth reference layer set, on the other hand, equals the potentially available set, then deciding whether the depth-to-texture prediction is enabled or disabled for the current picture or the portion of the picture and inserting a flag into the data stream, the flag relating to the current picture or portion of the current picture and indicating whether the depth-to-texture prediction is enabled or disabled for the coding units within the current picture or the portion of the current picture, and if the intersection is unequal to the potentially available set, suppressing inserting the flag relating to the coding units within the current picture or the portion of the current picture and disabling the depth-to-texture prediction for the coding units, wherein the video encoding core, depending on the depth-to-texture prediction being enabled or disabled for the current coding unit, applies or not applies depth-to-texture prediction for a current coding unit among the coding units within the current picture or the portion of the current picture.

Another embodiment may have a non-transitory digital storage medium having a computer program stored thereon to perform the method for 3D video decoding, the method having the steps of: decoding, performed by a video decoding core, a sequence of layers of a video from a data stream using intra-layer prediction, each layer representing depth or texture of a respective one of a plurality of views, the video decoding core supporting, for layers representing texture, inter-view texture prediction from layers representing texture of a different view, reading a first parameter set from the data stream, the first parameter set relating to a temporal portion of the video relating to a timestamp of a current picture, and derive therefrom, for a current picture of a current layer which represents texture, a texture reference layer set of layers representing texture and a depth reference layer set of layers representing depth, reading a second parameter set from the data stream, the second parameter set relating to the current picture or a portion of the current picture, and derive therefrom, for coding units within the current picture or the portion of the current picture, a selected texture reference layer set of layers representing texture from the texture reference layer set, each layer of the selected texture reference layer set, if an intersection of a potentially available set of layers representing depth of views the texture of which is represented by any of the selected texture reference layer set, on the one hand and a depth reference layer set of layers representing depth determined by the first parameter set, on the other hand equals the potentially available set, then reading a flag from the data stream, the flag relating to the current picture or the portion of the current picture and indicating whether the depth-to-texture prediction is enabled or disabled for the coding units within the current picture or the portion of the current picture, and if the intersection is unequal to the potentially available set, then inferring the flag relating to the coding units within the current picture or the portion of the current picture as indicating that the depth-to-texture prediction is disabled for the coding units, wherein the video decoding core, depending on the flag, applies or not applies depth-to-texture prediction for a current coding unit among the coding units within the current picture or the portion of the current picture, when said computer program is run by a computer.

Another embodiment may have a non-transitory digital storage medium having a computer program stored thereon to perform the method for 3D video encoding, the method having the steps of: encoding, performed by a video encoding core, a sequence of layers of a video into a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, inserting a first parameter set into the data stream, the first parameter set relating to a temporal portion of the video relating to a timestamp of a current picture, and indicating, for a current picture of a current layer which represents texture, a texture reference layer set of layers representing texture and a depth reference layer set of layers relating to depth, inserting a second parameter set into the data stream, the second parameter set relating to the current picture or a portion of the current picture, and indicating, for coding units within the current picture or a portion of the current picture, a selected texture reference layer set of layers representing texture from the texture reference layer set, if an intersection of a potentially available set of layers representing depth of views the texture of which is represented by any of the selected texture reference layer set, on the one hand and the depth reference layer set, on the other hand, equals the potentially available set, then deciding whether the depth-to-texture prediction is enabled or disabled for the current picture or the portion of the picture and inserting a flag into the data stream, the flag relating to the current picture or portion of the current picture and indicating whether the depth-to-texture prediction is enabled or disabled for the coding units within the current picture or the portion of the current picture, and if the intersection is unequal to the potentially available set, suppressing inserting the flag relating to the coding units within the current picture or the portion of the current picture and disabling the depth-to-texture prediction for the coding units, wherein the video encoding core, depending on the depth-to-texture prediction being enabled or disabled for the current coding unit, applies or not applies depth-to-texture prediction for a current coding unit among the coding units within the current picture or the portion of the current picture, when said computer program is run by a computer.

Another embodiment may have a digital storage medium having stored thereon a data stream generated by a method for 3D video encoding, the method having the steps of: encoding, performed by a video encoding core, a sequence of layers of a video into a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, inserting a first parameter set into the data stream, the first parameter set relating to a temporal portion of the video relating to a timestamp of a current picture, and indicating, for a current picture of a current layer which represents texture, a texture reference layer set of layers representing texture and a depth reference layer set of layers relating to depth, inserting a second parameter set into the data stream, the second parameter set relating to the current picture or a portion of the current picture, and indicating, for coding units within the current picture or a portion of the current picture, a selected texture reference layer set of layers representing texture from the texture reference layer set, if an intersection of a potentially available set of layers representing depth of views the texture of which is represented by any of the selected texture reference layer set, on the one hand and the depth reference layer set, on the other hand, equals the potentially available set, then deciding whether the depth-to-texture prediction is enabled or disabled for the current picture or the portion of the picture and inserting a flag into the data stream, the flag relating to the current picture or portion of the current picture and indicating whether the depth-to-texture prediction is enabled or disabled for the coding units within the current picture or the portion of the current picture, and if the intersection is unequal to the potentially available set, suppressing inserting the flag relating to the coding units within the current picture or the portion of the current picture and disabling the depth-to-texture prediction for the coding units, wherein the video encoding core, depending on the depth-to-texture prediction being enabled or disabled for the current coding unit, applies or not applies depth-to-texture prediction for a current coding unit among the coding units within the current picture or the portion of the current picture.

According to another embodiment, a 3D video decoder may have: a video decoding core configured to decode a sequence of layers of a video from a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, an inter-component prediction switch configured to read a first parameter set from the data stream, the first parameter set relating to a temporal portion of the video, and derive therefrom, for a current picture of a current layer which represents texture, the timestamp of which is contained within the temporal portion, a texture reference layer set of layers representing texture, read a second parameter set from the data stream, the second parameter set relating to a portion of the current picture or a portion of the current picture, and derive therefrom, for a current coding unit of the current picture, a selected texture reference layer set of layers representing texture from the texture reference layer set, each layer of the selected texture reference layer set including a picture at the current picture's timestamp, and, on the basis of the selected texture reference layer set, an intersection of a potentially available set of layers representing depth of views the texture of which is represented by any of the selected texture reference layer set, on the one hand and a depth reference layer set of layers representing depth determined by the first parameter set, on the other hand, read, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video decoding core is configured to be responsive to the flags for the layers of the intersection in order to, depending on the flags, apply or not apply depth-to-texture prediction using one or more of the layers of the intersection as depth-to-texture prediction reference for the current coding unit.

According to another embodiment, a 3D video encoder may have: a video encoding core configured to encode a sequence of layers of a video into a data stream using intra-layer prediction, each layer representing depth or texture of a respective one of a plurality of views, the video encoding core supporting, for layers representing texture, inter-view texture prediction from layers representing texture of a different view and depth-to-texture prediction from layers representing depth, an inter-component prediction switch configured to insert a first parameter set into the data stream, the first parameter set relating to a temporal portion of the video, and indicating, for a current picture of a current layer which represents texture, the timestamp of which is contained within the temporal portion, a texture reference layer set of layers representing texture and a depth reference layer set of layers relating to depth, insert a second parameter set from the data stream, the second parameter set relating to a portion of the current picture or a portion of the current picture, and indicating, for a current coding unit of the current picture, a selected texture reference layer set of layers representing texture from the texture reference layer set, each layer of the selected texture reference layer set including a picture at the current picture's timestamp, derive an intersection of a potentially available set of layers representing depth of views the texture of which is represented by any of the selected texture reference layer set, on the one hand and the depth reference layer set, on the other hand, insert, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video encoding core is configured to, depending on whether the depth-to-texture prediction using the layers of the intersection as depth-to-texture prediction reference is enabled or disabled for the current coding unit, apply or not apply depth-to-texture prediction using the layers of the intersection as depth-to-texture prediction reference for the current coding unit.

According to another embodiment, a method for 3D video decoding may have the steps of: decoding, performed by a video decoding core, a sequence of layers of a video from a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, reading a first parameter set from the data stream, the first parameter set relating to a temporal portion of the video, and derive therefrom, for a current picture of a current layer which represents texture, the timestamp of which is contained within the temporal portion, a texture reference layer set of layers representing texture and a depth reference layer set of layers relating to depth, reading a second parameter set from the data stream, the second parameter set relating to a portion of the current picture or a portion of the current picture, and derive therefrom, for a current coding unit of the current picture, a selected texture reference layer set of layers representing texture from the texture reference layer set, each layer of the selected texture reference layer set including a picture at the current picture's timestamp, and, on the basis of the selected texture reference layer set, an intersection of a potentially available set of layers representing depth of views the texture of which is represented by any of the selected texture reference layer set, on the one hand and the depth reference layer set, on the other hand, reading, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video decoding core depending on the flags for the layers of the intersection applies or not applies depth-to-texture prediction using one or more of the layers of the intersection as depth-to-texture prediction reference for the current coding unit.

According to another embodiment, a method for 3D video encoding may have the steps of: encoding, performed by a video encoding core, a sequence of layers of a video into a data stream using intra-layer prediction, each layer representing depth or texture of a respective one of a plurality of views, the video encoding core supporting, for layers representing texture, inter-view texture prediction from layers representing texture of a different view and depth-to-texture prediction from layers representing depth, inserting a first parameter set into the data stream, the first parameter set relating to a temporal portion of the video, and indicating, for a current picture of a current layer which represents texture, the timestamp of which is contained within the temporal portion, a texture reference layer set of layers representing texture and a depth reference layer set of layers relating to depth, inserting a second parameter set from the data stream, the second parameter set relating to a portion of the current picture or a portion of the current picture, and indicating, for a current coding unit of the current picture, a selected texture reference layer set of layers representing texture from the texture reference layer set, each layer of the selected texture reference layer set including a picture at the current picture's timestamp, deriving an intersection of a potentially available set of layers representing depth of views the texture of which is represented by any of the selected texture reference layer set, on the one hand and the depth reference layer set, on the other hand, inserting, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video encoding core, depending on whether the depth-to-texture prediction using the layers of the intersection as depth-to-texture prediction reference is enabled or disabled for the current coding unit, applies or not applies depth-to-texture prediction using the layers of the intersection as depth-to-texture prediction reference for the current coding unit.

Another embodiment may have a non-transitory digital storage medium having a computer program stored thereon to perform the method for 3D video decoding, the method having the steps of: decoding, performed by a video decoding core, a sequence of layers of a video from a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, reading a first parameter set from the data stream, the first parameter set relating to a temporal portion of the video, and derive therefrom, for a current picture of a current layer which represents texture, the timestamp of which is contained within the temporal portion, a texture reference layer set of layers representing texture and a depth reference layer set of layers relating to depth, reading a second parameter set from the data stream, the second parameter set relating to a portion of the current picture or a portion of the current picture, and derive therefrom, for a current coding unit of the current picture, a selected texture reference layer set of layers representing texture from the texture reference layer set, each layer of the selected texture reference layer set including a picture at the current picture's timestamp, and, on the basis of the selected texture reference layer set, an intersection of a potentially available set of layers representing depth of views the texture of which is represented by any of the selected texture reference layer set, on the one hand and the depth reference layer set, on the other hand, reading, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video decoding core depending on the flags for the layers of the intersection applies or not applies depth-to-texture prediction using one or more of the layers of the intersection as depth-to-texture prediction reference for the current coding unit, when said computer program is run by a computer.

Another embodiment may have a non-transitory digital storage medium having a computer program stored thereon to perform the method for 3D video encoding, the method having the steps of: encoding, performed by a video encoding core, a sequence of layers of a video into a data stream using intra-layer prediction, each layer representing depth or texture of a respective one of a plurality of views, the video encoding core supporting, for layers representing texture, inter-view texture prediction from layers representing texture of a different view and depth-to-texture prediction from layers representing depth, inserting a first parameter set into the data stream, the first parameter set relating to a temporal portion of the video, and indicating, for a current picture of a current layer which represents texture, the timestamp of which is contained within the temporal portion, a texture reference layer set of layers representing texture and a depth reference layer set of layers relating to depth, inserting a second parameter set from the data stream, the second parameter set relating to a portion of the current picture or a portion of the current picture, and indicating, for a current coding unit of the current picture, a selected texture reference layer set of layers representing texture from the texture reference layer set, each layer of the selected texture reference layer set including a picture at the current picture's timestamp, deriving an intersection of a potentially available set of layers representing depth of views the texture of which is represented by any of the selected texture reference layer set, on the one hand and the depth reference layer set, on the other hand, inserting, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video encoding core, depending on whether the depth-to-texture prediction using the layers of the intersection as depth-to-texture prediction reference is enabled or disabled for the current coding unit, applies or not applies depth-to-texture prediction using the layers of the intersection as depth-to-texture prediction reference for the current coding unit, when said computer program is run by a computer.

Another embodiment may have a digital storage medium having stored thereon a data stream generated by a method for 3D video encoding, the method having the steps of: encoding, performed by a video encoding core, a sequence of layers of a video into a data stream using intra-layer prediction, each layer representing depth or texture of a respective one of a plurality of views, the video encoding core supporting, for layers representing texture, inter-view texture prediction from layers representing texture of a different view and depth-to-texture prediction from layers representing depth, inserting a first parameter set into the data stream, the first parameter set relating to a temporal portion of the video, and indicating, for a current picture of a current layer which represents texture, the timestamp of which is contained within the temporal portion, a texture reference layer set of layers representing texture and a depth reference layer set of layers relating to depth, inserting a second parameter set from the data stream, the second parameter set relating to a portion of the current picture or a portion of the current picture, and indicating, for a current coding unit of the current picture, a selected texture reference layer set of layers representing texture from the texture reference layer set, each layer of the selected texture reference layer set including a picture at the current picture's timestamp, deriving an intersection of a potentially available set of layers representing depth of views the texture of which is represented by any of the selected texture reference layer set, on the one hand and the depth reference layer set, on the other hand, inserting, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video encoding core, depending on whether the depth-to-texture prediction using the layers of the intersection as depth-to-texture prediction reference is enabled or disabled for the current coding unit, applies or not applies depth-to-texture prediction using the layers of the intersection as depth-to-texture prediction reference for the current coding unit.

The present application is based on the finding that 3D video coding/decoding supporting inter-component prediction may be made operatable with respect to a broader range of settings with respect to accompanying individual views with depth and deactivation/enablement of inter-component prediction, if one or more flags in the data stream are used to control the enablement/disablement of the availability of inter-component prediction for coding units of a current picture. In accordance with a first aspect of the present application, conditional signalization of such a flag is used to keep the additional expenditure of side information within the data stream low: the flag is comprised by the data stream merely if an intersection of a potentially available set of layers representing depth of views, the texture of which is represented by any of a selected texture reference layer set indicated by a second parameter set in the data stream relating to a current picture or a portion of the current picture on the one hand and a depth reference layer set comprised by the data stream and relating to a temporal portion of the video containing, or relating to, or extending beyond, the timestamp of the current picture, on the other hand, equals the potentially available set. Otherwise, the flag is not comprised by the data stream and inferred at the decoding side as indicating that the depth-to-texture prediction is disabled for a current coding unit. Thus, inter-component prediction is, for a predetermined coding unit, available only if for each of the layers representing texture comprised by the selected texture reference layer set and thus potentially serving as reference for inter-view texture prediction for the current coding unit of the current picture, there is a layer representing depth in the depth reference layer set. By this measure, it is feasible for the encoder to signal by way of the flag whether each of the layers representing depth actually has a picture of the same timestamp as the current picture in the data stream. Alternatively, the 3D video encoder may also voluntarily disable depth-to-texture prediction by way of the flag, although each of the layers representing depth comprised by the intersection has a picture coded into the data stream. The 3D video decoder simply conditionally reads the flag from the data stream and enables/disables the inter-component prediction accordingly. In accordance with a second aspect of the present application, variability in enabling/disabling inter-component prediction is increased by spending one flag per layer representing depth comprised by the intersection. By this measure, inter-component prediction may be applied even if at least one of the layers representing depth comprised by the intersection misses a corresponding picture of the timestamp of the current picture in the data stream. Further, texture-to-depth prediction may additionally or alternatively, enabled/disabled likewise.

BRIEF DESCRIPTION OF THE DRAWINGS

Embodiments of the present invention will be detailed subsequently referring to the appended drawings, in which:

FIG. 11a-11c show syntax examples illustrating how 3D-HEVC could use the embodiment of FIGS. 6 to 10;

FIG. 16 shows the general slice segment header syntax;

FIG. 17a-17c show the general slice segment header semantics;

FIG. 18 shows the derived variables;

FIG. 19 shows changes of the current 3D-HEVC specification;

FIG. 20a-20c show the general slice segment header syntax; and

FIG. 21 shows the derived variables.

DETAILED DESCRIPTION OF THE INVENTION

Figure 1:
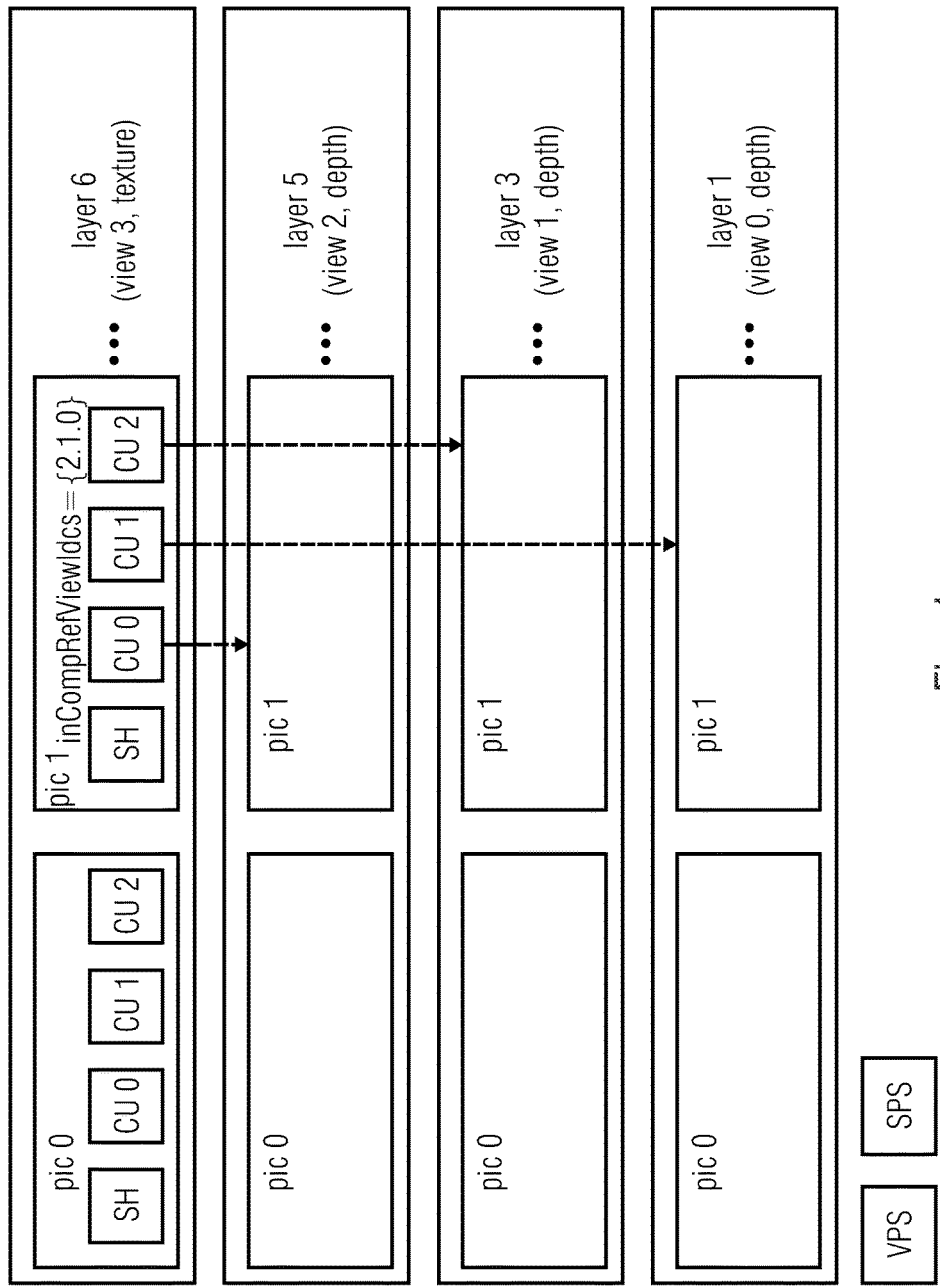
FIG. 1 shows a schematic diagram of a layer-structure of a video and exemplifies inter-component prediction from depth to texture using 3D-HEVC current design as an example.
Figure 2:
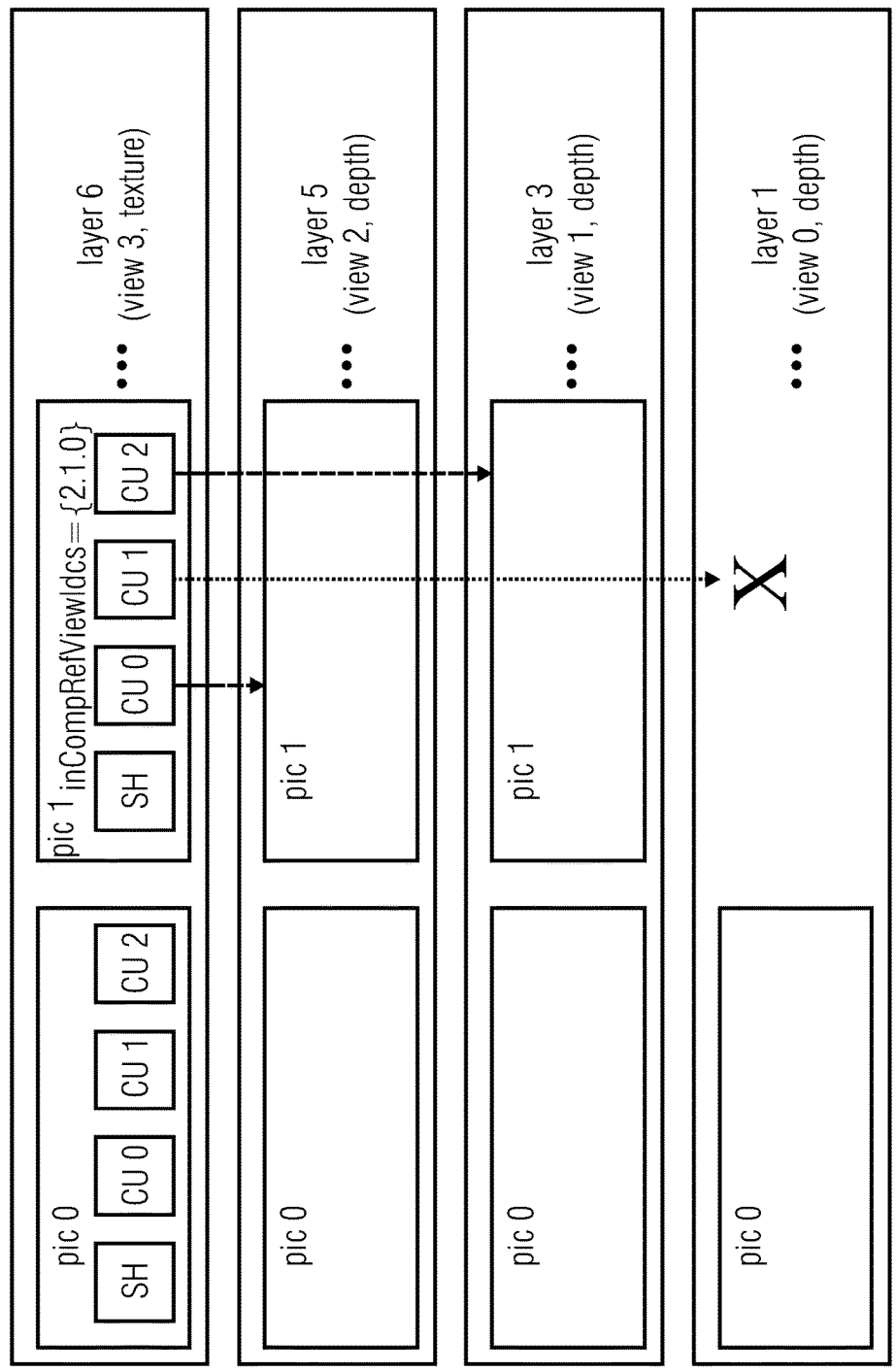
FIG. 2 shows a schematic diagram illustrating an issue in inter-component prediction occurring in the example of FIG. 1.
Figure 3:
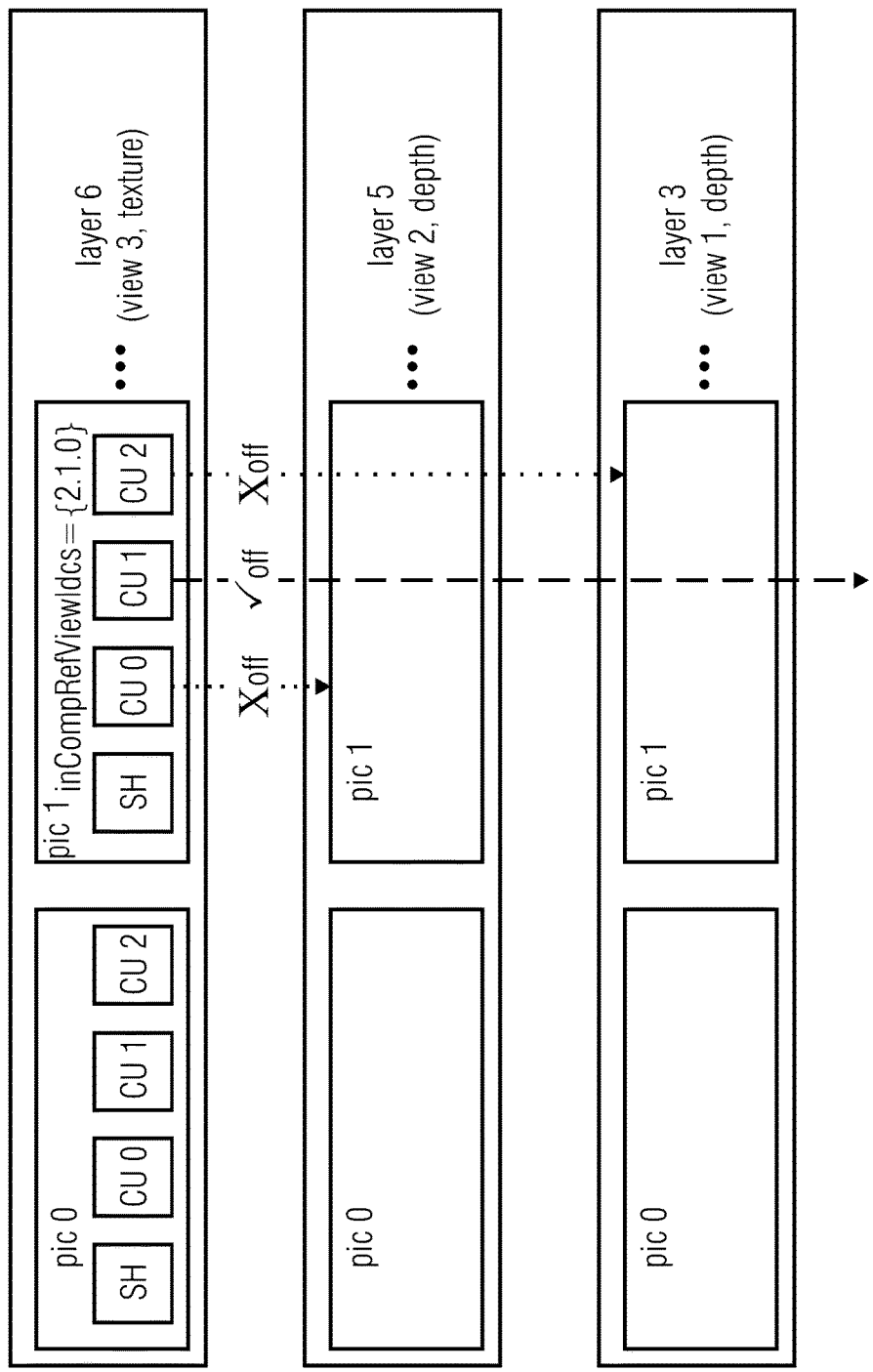
FIG. 3 shows a schematic diagram illustrating another issue involved with the inter-component prediction of FIG. 1.

Before describing embodiments of the present application with respect to different aspects which deal with 3D video coding/decoding supporting inter-component prediction, the thoughts and advantages underlying the same are explained below illustratively by resuming the description of the issues involved in the current design of 3D-HEVC and illustrating how same may be solved. However, this description should not be interpreted as limiting the subsequently explained embodiments to be applicable to 3D-HEVC only. Rather, the issues exemplified in the introductory portion of the specification of the present application with respect to 3D-HEVC may also occur in connection with other 3D video codecs and accordingly, although the following considerations and explanations of the thoughts and advantages are valuable for the ease of understanding, the specific details shall not be treated as limiting the following and subsequently explained embodiments. Rather, these details shall be treated as forming a possible implementation of the subsequent embodiments.

The thoughts and advantages relating to embodiments concerning a first aspect of the present application are illustrated by resuming the description of issues concerning the 3D-HEVC current design, which is called "solution 1" in the following.

Solution 1 resolves the first issue by signaling conditionally a flag in_comp_pred_flag in the slice header (SH) of the current picture. The flag in_comp_pred_flag indicates whether pictures of all reference component layers of views included in inCompRefViewIdcs are present in the AU of the current picture.

Tools using inter-component prediction are enabled or disabled for a picture as follows:

If the current picture is a depth picture, the reference component is texture. Otherwise (the current picture is a texture picture), the reference component is depth.

Views which might be used for inter-component prediction of the current picture are derived from syntax elements in the VPS, SPS and the slice header of the current picture.

In the following it is assumed that indices of these views are included in the list inCompRefViewIdcs.

The flag in_comp_pred_flag is derived as follows:

If both of the following conditions are true, the flag in_comp_pred_flag is parsed from the slice header of the current picture:

For each view i in inCompRefViewIdcs, the following is true:

Syntax elements in the VPS signal that a reference component layer of view i is present in the bitstream and available as reference layer for the layer containing the current picture.

One or more tools using inter-layer prediction are enabled for the layer containing the current picture by SPS and/or the VPS enabling flags.

Otherwise, in comp pred flag is no parsed, but inferred to be equal to 0.

When in_comp_pred_flag is equal to 1, pictures of all reference component layers of views in inCompRefViewIdcs are entailed to present in the AU of the current picture.

A particular tool using inter-component prediction is enabled or disabled for the current picture as follows:

If both of the following conditions are true, the particular tool using inter-component prediction is enabled for the current picture:

The flag in_comp_pred_flag is equal to 1.

The particular tool using inter-layer prediction is enabled for the layer containing the current picture by SPS and/or the VPS enabling flags.

Otherwise, the particular tool using inter-component prediction is disabled for current picture.

Since only one bit is conditionally send in the slice headers, solution 1 resolved the first issue with very little additional signaling overhead.

Figure 4:
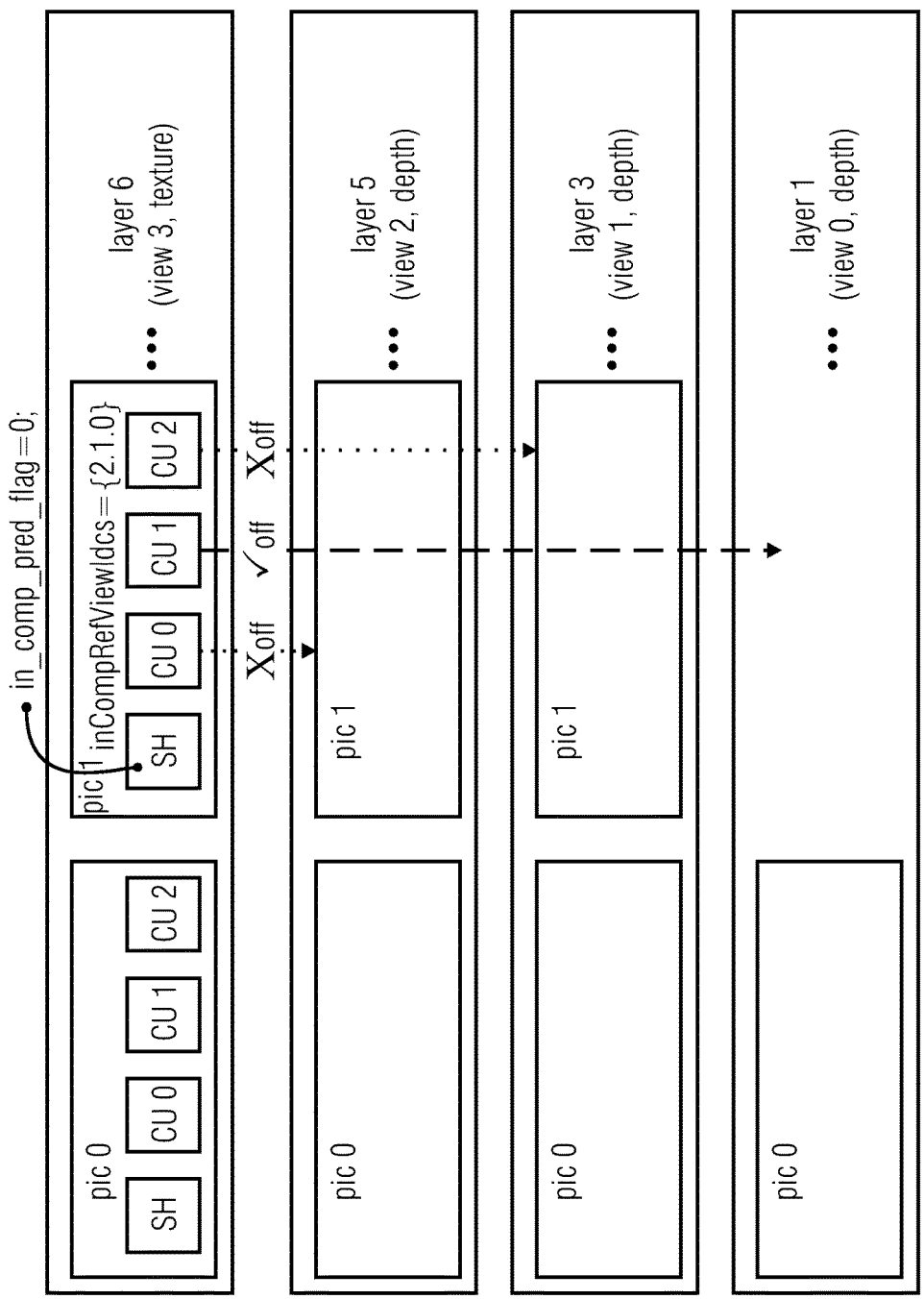
FIG. 4 shows a schematic diagram illustrating a possible solution for overcoming the issue of FIG. 2 for illustrating the advantages and thoughts underlying embodiments of the present application according to a first aspect.

See Example 5 in FIG. 4. As depicted in FIG. 4, picture 1 in of the depth of view 0 is missing. However, since all depth layers for all views included in inCompRefViewIdcs={2, 1, 0} are present in the bitstream in comp_pred_flag is parsed from the slice header of the current slice. Since in_comp_pred_flag is equal to 0 (which is needed since picture 1 in of the depth of view 0 is not present), inter-component prediction is disabled for the current picture.

The syntax and semantics of the current 3D-HEVC design specification could be amended as shown in FIG. 16 in order to realize the above-outlined "solution 1".

Changes compared to the current 3D-HEVC draft are marked by underlining and cancelations are marked by strike-through.

The general slice segment header semantics fitting to the syntax of FIG. 16 are shown in FIGS. 17a-17c.

The variable DepthFlag is set equal to VpsDepthFlag[nuh_layer_id] and the variable ViewIdx is set equal to ViewOrderIdx[nuh_layer_id]. The variables IvMvPredFlag, IvMvScalingFlag, SubPbSize, IvResPredFlag, ViewSynthesisPredFlag, DepthBasedBlkPartFlag, DepthRefinementFlag, MpiSubPbSize, IntraContourFlag, IntraSdcWedgeFlag, QtPredFlag, InterSdcFlag and DisparityDerivationFlag are derived as specified in FIG. 18.

The thoughts and advantages related to embodiments described further below which relate to a second aspect of the present application, are illustrated by resuming the description of issues relating to the current design of 3D-HEVC by presenting a solution called "solution 2" in the following.

Solution 2 resolves the first and the second issue by
  conditionally signaling a flag in_comp_pred_flag[ i ] for each reference component layer i which is both: a) present in the bitstream and available as reference layer for the layer including the current picture; and b) from a view included in inCompRefViewIdcs
  enabling or disabling a tool for a CU needing a picture of a particular reference component layer x depending on in_comp_pred_flag[x].

Tools using inter-component prediction are enabled or disabled for a coding unit as follows:

If the current picture is a depth picture, the reference component is texture. Otherwise (the current picture is a texture picture), the reference component is depth.

Views which might be used for inter-component prediction of the current picture are derived from syntax elements in the VPS, SPS and the slice header of the current picture. In the following it is assumed that indices of these views are included in the list inCompRefViewIdcs.

For i in the range of 0 to N−1, with N denoting the number of views in inCompRefViewIdcs, the flag in_comp_pred_flag[i] is derived as follows:
  If both of the following conditions are true, the flag in_comp_pred_flag[i] is parsed from the slice header of the current picture:
    Syntax elements in the VPS signal that the reference component layer of view i is present in the bitstream and available as reference layer for the layer containing the current picture.
    One or more tools using inter-layer prediction are enabled for the layer containing the current picture by SPS and/or the VPS enabling flags.
  Otherwise, in comp pred flag[i] is no parsed, but set equal to 0.

For i in the range of 0 to N−1, with N denoting the number of views in inCompRefViewIdcs, the following applies:
  When in_comp_pred_flag[i] is equal to 1, a picture of the reference component layer of the i-th view in inCompRefViewIdcs is entailed to present in the AU of the current picture.

A particular tool using inter-component prediction is enabled or disabled for a current CU of the current picture as follows:
  If both of the following conditions are true, the particular tool using inter-component prediction is enabled for the current CU of the current picture:
    The flag in_comp_pred_flag[x] is equal to 1, with x having a value such that inCompRefViewIdcs[x] is the view of the reference component layer used for inter-component prediction of the current CU.
    The particular tool using inter-layer prediction is enabled for the layer containing the current picture by SPS and/or the VPS enabling flags.
  Otherwise, the particular tool using inter-component prediction is disabled for the current CU of the current picture.

Solution 2 resolves the first and the second issue. However more bits compared to solution 1 need to be signaled in the slice header.

Figure 5:
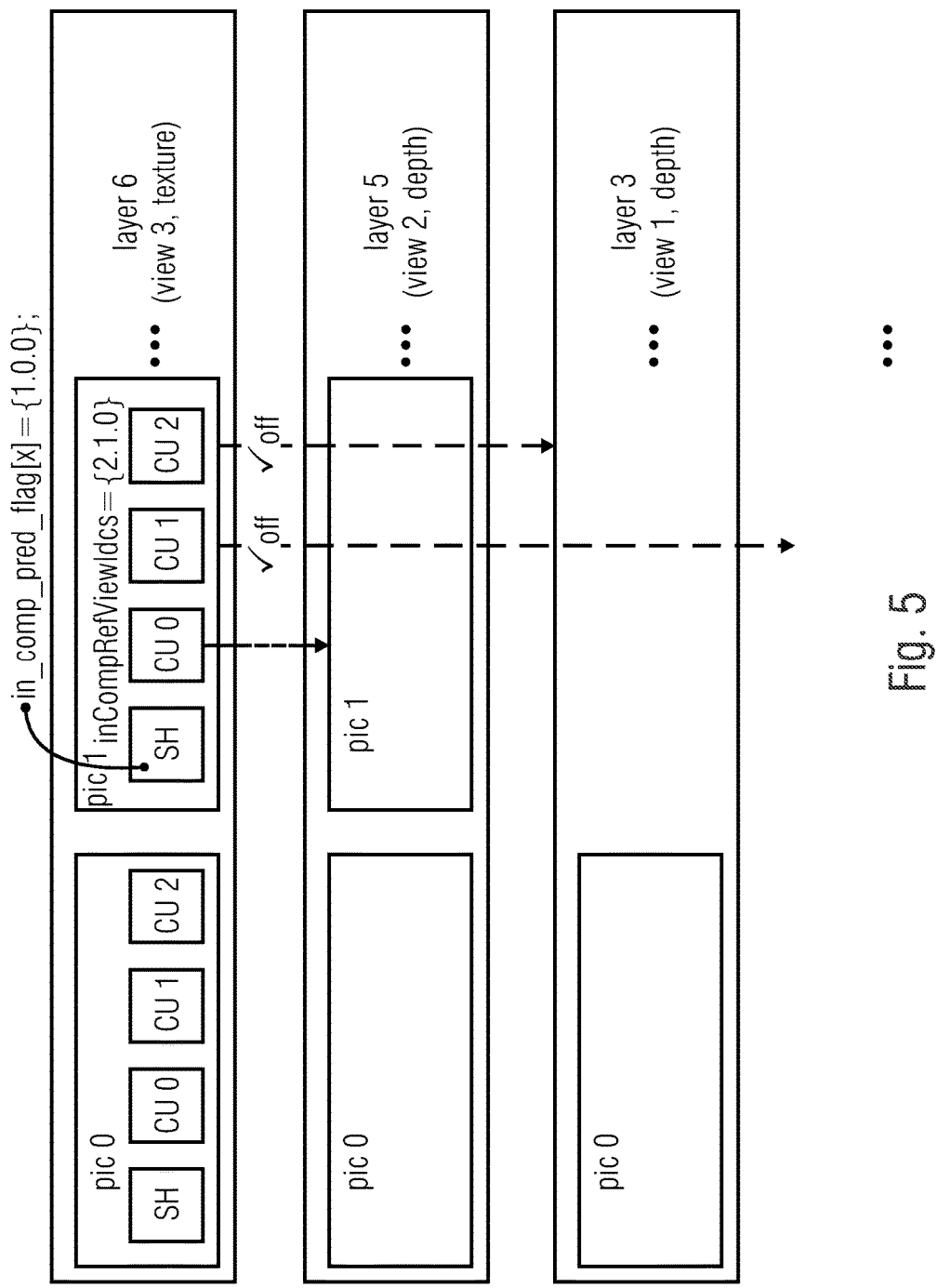
FIG. 5 shows a schematic diagram illustrating a second solution for overcoming the issue of FIG. 2 along with the issue illustrated with regard to FIG. 3 so as to illustrate the advantages and thoughts underlying embodiments of the parameter of a second aspect.

Let us define Example 6 as follows with reference to FIG. 5. The flag in_comp_pred_flag is derived for each view in inCompRefViewIdcs={2,1,0} as follows: The flags in_comp_pred_flag_[0] and in_comp_pred_flag[1] are parsed from the slice header of the current picture, since the depth layer of view 2 (inCompRefViewIdcs[0]) and view 1 (inCompRefViewIdcs[1]) are present in the bitstream. The flag in comp_pred_flag[2] is set equal to 0, since the depth layer of view 0 (inCompRefViewIdcs[2]) is not present in the bitstream.

A picture of the depth layer of view 2 (inCompRefViewIdcs[0]) is present. This is indicated by the parsed value of in_comp_pred flag[0] being equal to 1, such that inter-component prediction from depth is enabled for CU 0. A picture of the depth layer of view 0 (inCompRefViewIdcs[2]) is not present. This is indicated by the inferred value of in_comp_pred_flag_[2] being equal to 0, such that inter-component prediction from depth is disabled for CU 1. A picture of the depth layer of view 1 (inCompRefViewIdcs[1]) is not present. This is indicated by the parsed value of in_comp_pred_flag_[1] being equal to 0, such that inter-component prediction form depth is disabled for CU 2.

To realize solution 2, syntax and semantics of the current 3D-HEVC specification could be changed as shown in FIG. 19. Changes compared to the current 3D-HEVC draft are again marked by underlining and strike through.

1.7.3.6.1 General slice segment header syntax

The specifications in clause F.7.4.7.1 apply with the modifications and additions shown in FIG. 20a-20c.

The variable DepthFlag is set equal to VpsDepthFlag[nuh_layer_id] and the variable ViewIdx is set equal to ViewOrderIdx[nuh_layer_id].

The variables IvMvPredFlag, IvMvScalingFlag, SubPbSize, IvResPredFlag, ViewSynthesisPredFlag, DepthBasedBlkPartFlag, DepthRefinementFlag, MpiSubPbSize, IntraContourFlag, IntraSdcWedgeFlag, QtPredFlag, InterSdcFlag and DisparityDerivationFlag are derived as specified in FIG. 21.

Figure 6:
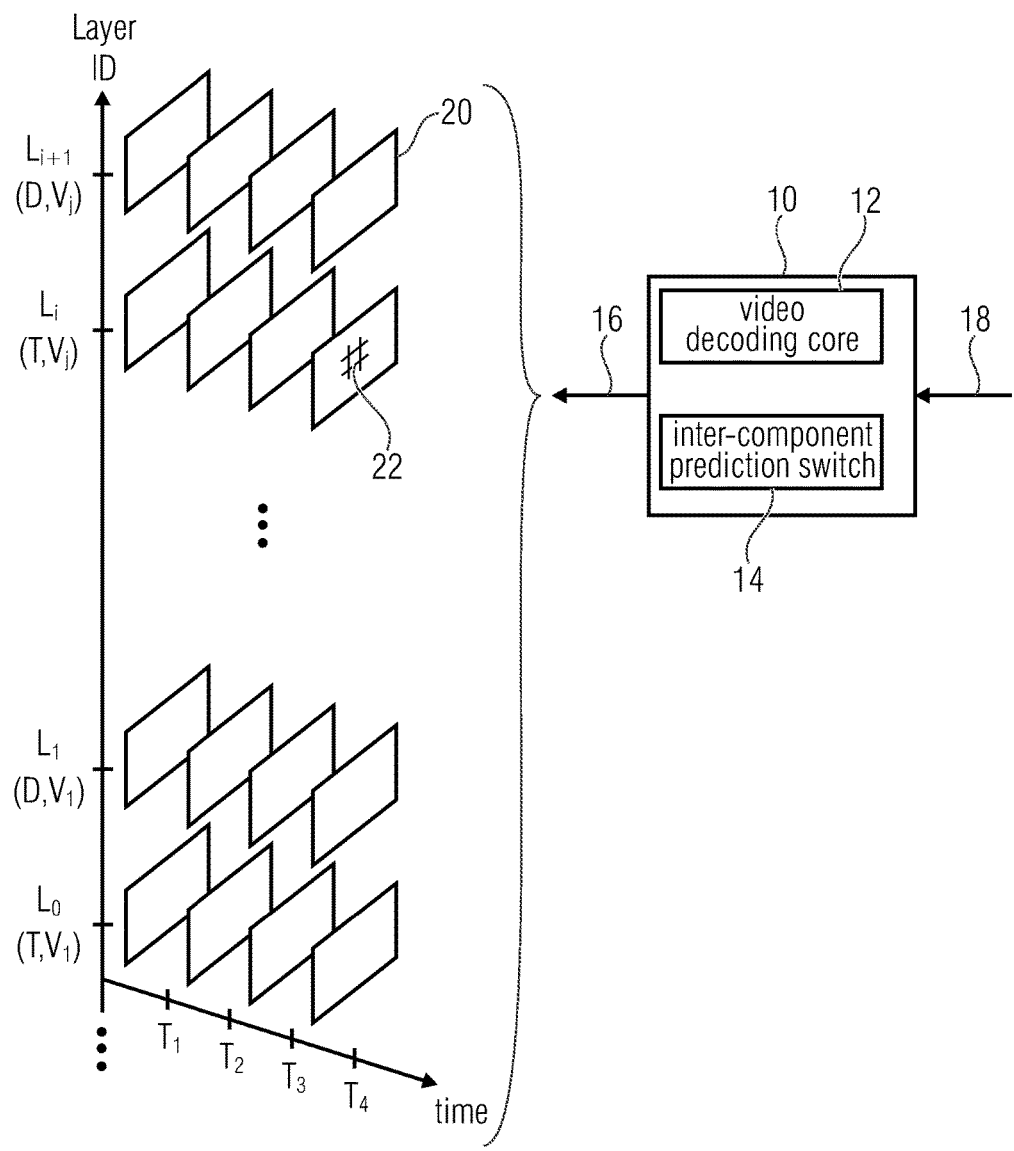
FIG. 6 shows a block diagram of a 3D video decoder in accordance with an embodiment of the present application along with an illustration of a 3D video.

FIG. 6 shows a 3D video decoder 10 in accordance with a first aspect of the present application. The 3D video decoder comprises a video decoding core 12 and an inter-component prediction switch 14. The video decoding core 12 is configured to decode a sequence of layers of a video 16 from a data stream 18. Each layer is composed of a temporal sequence of pictures 20 which are illustrated as rectangles in FIG. 6. In FIG. 6 the layers are illustrated one on top of the other registered to one another along the temporal axis, with FIG. 6 exemplarily showing four layers $L_0, L_1, \ldots L_i$ and $L_{i+1}$, even though the number of layers is not restricted to any specific number. Each layer corresponds to one of texture (T) and depth (D) of a certain view V# of a set of views of video 16. FIG. 6, for instance, illustrates that layer $L_0$ belongs to the texture of view $V_1$, layer $L_1$ belongs to depth of view $V_1$, layer $L_i$ belong to texture of $V_i$ and layer $L_{i+1}$ belongs to depth of view $V_j$. The number of views may, for instance, be any number greater than 1, and it should be noted, for instance, that there is no need for the presence of two layers for each view of the set $\Omega_v$ of views contained in the video 16, one relating to the texture and the other one relating to the depth of the corresponding view. For instance, video 16 may contain for each view of set $\Omega_v$ one texture layer, while the sequence of layers in the video 16 does not comprise any depth related layer for this view.

Accordingly, the pictures of each layer are either texture pictures or depth pictures or depth maps. Pictures of the various layers belonging to the same timestamp T of which four consecutive ones $T_1$ to $T_4$ are exemplarily shown in FIG. 6 form one access unit in data stream 18. It should be noted, however, that there is no obligation that each layer has a picture encoded into data stream 18 for each timestamp. Accordingly, there may, for instance, be a timestamp where one of the depth layers representing depth misses a picture for the corresponding timestamp. The reasons for missing such a picture may be manifold and include, for instance, different temporal resolution or picture pitch among the various layers or the like.

Thus, in the manner outlined up to now, the video three dimensionally represents a scene using layers showing the scene in different views $V_j$ corresponding, for instance, to different viewpoints from which the scene is captured. The depth related layers or layers representing depth provide a depth information of this scene at the respective view and accordingly, pictures of layers representing texture represent a spatial sampling of the scene at the respective view, with the samples corresponding to luminance and/or chrominance or luma and/or chroma, and the pictures corresponding to layers relating to depth represent a spatial sampling of the depth of the scene seen from the respective view of the samples relating to depth values. As far as the spatial resolution of the pictures of different layers is concerned, same may be equal to each other in accordance with an embodiment. However, in accordance with an alternative, different spatial resolutions of the pictures of different layers is allowed.

The video 16 as encoded into the data stream 18 in, and the video decoder core 12 decodes the video 16 by obeying, a decoding order defined among the pictures 20 of video 16. The decoding order guarantees that a currently decoded/coded picture merely depends on information concerning pictures already having been traversed according to the decoding order. According to the decoding order, pictures of one timestamp are coded/decoded in/from data stream 18 before coding/decoding pictures of another timestamp wherein, within one timestamp, the decoding order traverses the pictures of the various layers belonging to this timestamp along the layer ID, i.e. along the sequential order of the layers. As shown in FIG. 6, the decoding order may, for instance, traverse the layers in a manner so that the depth related layer for a certain view $V_j$ is traversed according to the sequential layer order or decoding order, respectively, subsequent to the corresponding texture related layer of the same view. Beyond that, the sequential order or decoding order could be such that layers belonging to one view $V_{j-1}$ are coded/decoded before layers of another view $V_j$ are coded/decoded.

Further, the video 16 is coded into data stream 18 in units of, and video decoding core 12 is accordingly configured to decode the sequence of layers of the video 16 from the data stream in units of, coding units of the pictures 20. In other words, coding units 20 are subdivided into coding units. The subdivision may, for instance, spatially subdivide the pictures 20 regularly resulting in rows and columns of coding units 22. Alternatively, coding units 22 may represent leaf nodes of a spatial recursive multi-tree subdivisioning of a picture 20. Beforehand, picture 20 may be pre-subdivided into tree root blocks regularly arranged in columns and rows so that the coding blocks 20 represent leaf blocks of multi-tree subdivisioning of the tree root blocks. The coding units may be coded into the data stream 18 according to one of different modes supported by the video codec, and accordingly video decoding core 12 may be configured to decode the coding units in one of these modes with a mode being indicated in the data stream 18 for each coding unit 22. The coding modes may use inter-layer prediction where one coding unit 22 is predicted on the basis of another layer, namely a layer preceding in layer or decoding order. Some other coding units may be coded using intra-layer prediction such as, for instance, using spatial prediction or temporal prediction on the basis of pictures of the same layer but preceding in decoding order. According to some coding modes, the prediction may lead from one view to another. For instance, a coding unit of one texture layer of one view may be predicted on the basis of a texture layer of another view and the same applies to depth layers. The video decoding core 12 does not only support inter-view texture prediction from layers representing texture of a different view. Rather, video decoding core 12 also allows for a coding mode where a coding unit 22 of a texture layer of a certain is predicted on the basis a depth layer of another view. Here, prediction crosses both view and component border. Optionally, video decoding core 12 may also support a coding mode according to which a coding unit of a picture of a depth layer is inter-component predicted on the basis of the texture layer of the same view.

Figure 7:
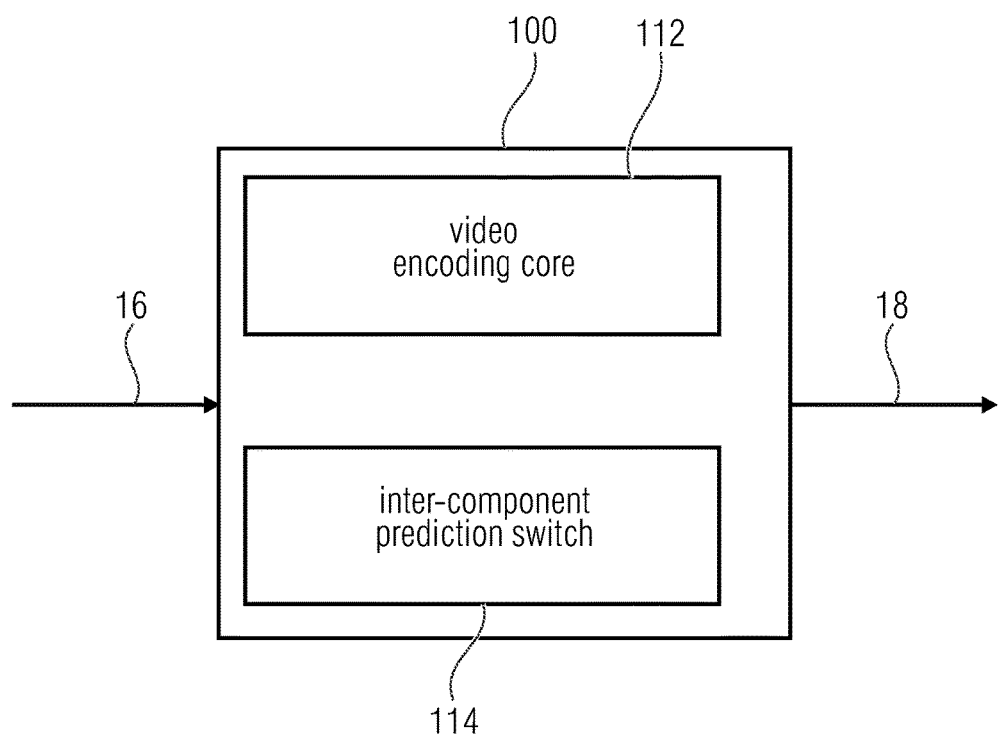
FIG. 7 shows a block diagram of a 3D video encoder fitting to the decoder of FIG. 6.

The task of the inter-component prediction switch 14 is, as outlined in more detail below, to inform the video decoding core 12 on the enablement/disablement of the depth-to-texture prediction for coding units of a texture layer from layers representing depth and belonging to a different view. Before describing the circumstance in detail, however, reference is made to FIG. 7 which shows a 3D video encoder fitting to the decoder of FIG. 6. The 3D video encoder of FIG. 7 is generally indicated using reference sign 100. The 3D video encoder 100 of FIG. 7 comprises a video encoding core 112 configured to decode the sequence of layers of video 16 into the data stream 18 using the same predictions as the video decoding core 12 does and described above, though, as well as an inter-component prediction switch 114 which, in a manner outlined below, signals flags within the data stream 18 to switch 14 of decoder 10 so that the mode of operation of en/decoding cores 12 and 112 is synchronized as far as the application or non-application of the depth-to-texture prediction with respect to certain coding units is concerned.

Before going into detail as far as the mode of operation and cooperation of switches 14 and 114 is concerned, examples of how the view-to-texture prediction could be implemented in en/decoding cores 12 and 112 are provided.

Figure 8A:
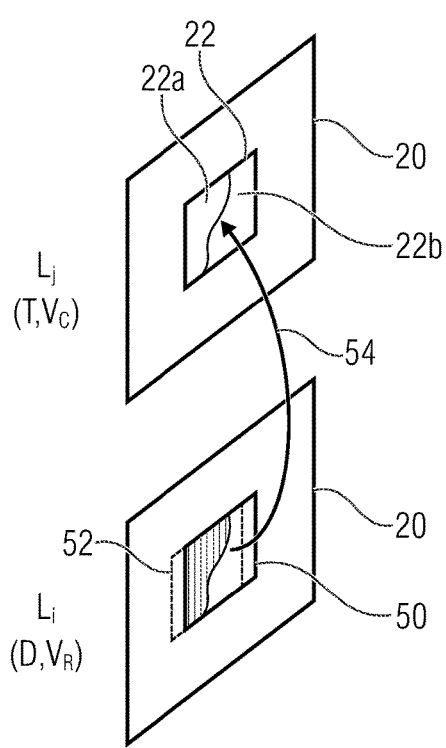
FIGS. 8a and 8b show schematic diagrams illustrating possible tools of the decoding/encoding cores assuming responsibility for the task of depth-to-texture prediction.

FIG. 8a illustrates, for instance, that coding/decoding cores 12 and 112 could be configured to, in applying depth-to-texture prediction to a coding unit 22 which lies here in a picture of a layer $L_j$ representing texture of a current view $V_c$, derive a partition of coding unit 22 from a in terms of disparity corresponding portion 50 of a picture of a layer $L_i (i<j)$ representing depth of a reference view $V_r \neq V_c$. The timestamp which pictures 20, including current coding unit 22 and corresponding portion 50, refer to, may be the same. For example, portion 50 may be located within picture 20 of the reference layer $L_i$ by shifting portion 50 relative to a co-located position of coding unit 22 in picture 20 of layer $L_j$ indicated by dashed line 52 in FIG. 8a by means of a disparity vector which de/encoding core 12/112 may derive on the basis of the depth values of picture 20 of layer $L_i$ or depth values of some other layers of other views or by spatially predicting the disparity from disparity vectors applied to portions of picture 20 of layer $L_j$ to portions neighboring the current coding unit 22. Threshold the depth values within portion 50 may be used in order to derive therefrom a bi-partitioning of portion 50, and this bi-partitioning may be transferred onto or copied onto coding unit 22 as illustrated by arrow 54 by en/decoding cores 12/112 in order to partition coding unit 22 into two partitions 22a and 22b. A partitioning into more than two partitions could be applied, however, as well. In any case, de/encoding core 12/112 may then subject both partitions 22a and 22b to separate predictions such as by applying separate motion information or separate motion vectors to these partitions in order to inter-predict the content of coding unit 22. The residual signal to this prediction signal thus obtained by separately predicting partitions 22a and 22b could be coded into the data stream 18 for coding unit 22 by encoding unit 112 and decoded from the data stream and added to the prediction signal by decoding core 112. Instead of inter-prediction, partitions 22a and 22b (and accordingly coding unit 22) could be subject to another sort of prediction signal derivation. For instance, spatial prediction of partitions 22a and 22b could be used with applying separate intra-prediction directions to partitions 22a and 22b so as to form the prediction signal for coding unit 22. Alternatively, separate parameters could be signaled by encoding core 112 via the data stream 18 for synthesizing the content of partitions 22a and 22b separately to form the prediction signal for coding unit 22.

Figure 8B:
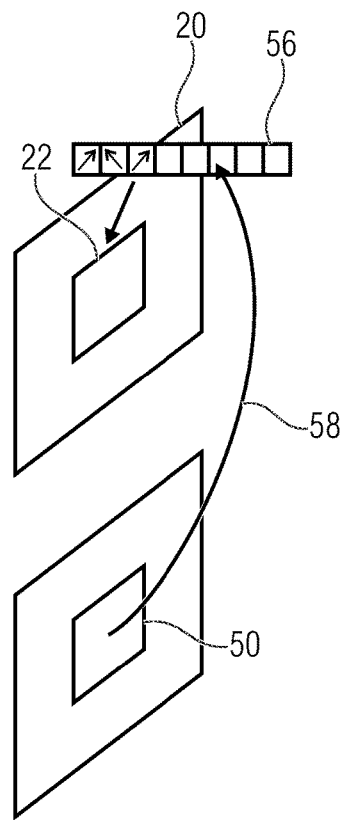

FIG. 8b illustrates that, additionally or alternatively, en/decoding cores 12/112 could, in applying the depth-to-texture prediction to coding unit 22, derive from the in terms of disparity corresponding portion of the depth reference picture 20 of layer $L_i$ derive a motion vector for coding/decoding the current coding unit 22. For example, core 12/112 could provide a list of motion vectors for coding/decoding coding unit 22, and from this list 56 at least one of the motion vector candidates could be derived from the corresponding portion 50 of the reference layer. The derivation is illustrated by arrow 58. Instead of deriving 58 a motion vector, a disparity vector could be derived for coding unit 22 in this manner with the coding unit being, in that case, an inter-predicted coding unit predicted by disparity-compensated prediction on the basis of a texture picture of another view. Encoding core 112 could either explicitly signal within the data stream 18 an index into a list 56, or inherent signalization may be used to derive the final prediction of the motion/disparity vector for coding unit 22. Motion and disparity vectors may be treated commonly in list 56.

As already announced above, the description brought forward below concentrates on the enablement/disablement of depth-to-texture prediction by switches 14/114, respectively, wherein decoding/encoding cores 12/112, under this control of switch 14/114, applies or does not apply the depth-to-texture prediction to coding unit 22. In case of not applying depth-to-texture prediction coding unit 22 could, for instance, be partitioned into the same number of partitions 22a and 22b, but simply by dividing the coding unit into partitions 22a and 22b of the same size and shape such as, for instance, by vertically or horizontally bisecting coding unit 22. In case of FIG. 8b, the non-depth-to-texture prediction alternative treatment of coding unit 22 by decoding/encoding cores 12/112 could be to form list 56 without any contribution of a vector candidate derived from portion 50 and thereby predicting the motion/disparity vector of coding unit 22 without any aid of layer $L_i$.

Summarizing the above, until now examples for the mode of operation of encoding/decoding cores 12/112 have been explained. With regard to FIGS. 8a and 8b, examples have been provided as to how the decoding/encoding cores could operate in case of applying depth-to-texture prediction to a certain coding unit 20 of a texture layer of a current view. An example of how decoding/encoding cores could operate in case of non-appliance of depth-to-texture prediction to coding unit 22 has been described as well. In the following, an embodiment of switches 14/114 is described which allows decoding/encoding cores 12/112 to, in synchrony, decide on the application or non-application of depth-to-texture prediction to a current coding unit 22.

Figure 9:
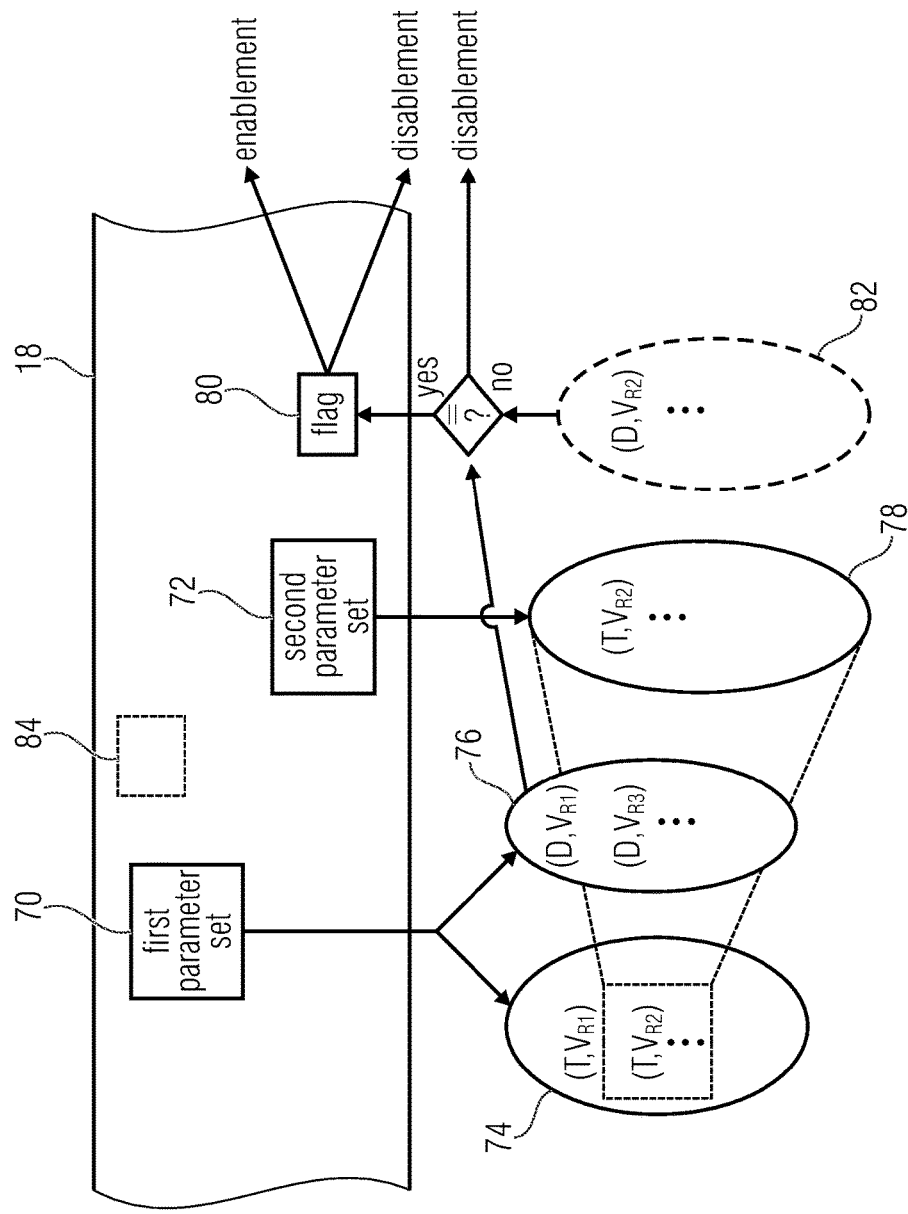
FIG. 9 shows a schematic diagram illustrating the data present in the data stream and involved in the mode of operation of switches 14 and 114 of decoder and encoder of FIGS. 6 and 7 in accordance with an embodiment of a first aspect of the present application.

Reference is made to FIG. 9. FIG. 9 shows the data stream 18 as comprising a first parameter set 70 and a second parameter set 72 which is inserted into data stream 18 by inter-component prediction switch 114 and read therefrom by switch 14 at the decoding side. Both sets relate to a current picture to which a current coding unit such as coding unit 22 of FIGS. 8a and 8b belongs. The first parameter set may, for instance, have a scope of or validity extending beyond the picture border of the current picture. The first parameter set 70 may, for instance, relate to a temporal portion of the video such as a sequence of pictures including the current picture or even the whole video. As became clear from the discussion with respect to 3D-HEVC, the first parameter set 70 may, for instance, be included in the VPS of the data stream 18 in case of the data stream being a 3D-HEVC data stream. For the temporal portion of the video 16 which the first parameter set 70 relates to, the first parameter set 70 indicates, and switch 14 of decoder 10 derives on the basis thereof, for the current picture of the current texture layer, a reference layer set 74 of layers representing texture. The indication may involve, and accordingly, switches 14/114 may use for derivation of set 74, a temporal ID of the current picture P, corresponding to the timestamp of the current picture. The first parameter set 70 also indicates for the temporal portion of the video 16 which parameter set 70 relates to, a depth reference layer set 76 of layers representing depth. Switches 14/144 need not to actually derive set 76. Rather, as will get clear from the subsequent description, it suffices if switches 14/144 are able to check whether a certain depth layer is member of set 76. Generally, set 74 comprises texture layers of reference views $V_{r\#}$ with a layer index smaller than the layer referring or representing the texture of the current view $V_c$ and set 76 encompasses the dependent depth layers of views $V_{r\#}$ other than the current view $V_c$, the layer index of which is also layer than the layer index of the texture layer of the current view to which the current picture belongs. That is, the first parameter set 70 generally indicates the inter-layer dependencies between the layers and specifically indicates the reference layers serving as a reference for the current layer of the current picture. As a side note it is indicated that, for texture-to-depth prediction enablement/disablement control, which switch 14/144 alternatively or additionally, assumes responsibility for, the dependent texture layer can be in the same view $V_c$. Note also, that the derivation of set 76 on the basis of parameter set 70 may further involve a parameter which is specific for the current picture, such as the temporal ID of the current picture, in which case the latter parameter may be interpreted as belonging to the parameter set 70, with then having a picture scope, or the derivation of set 76 on the basis of parameter set 70 may be interpreted as not being dependent on parameter set 70 exclusively, but also dependent on the further picture specific parameter. Additionally, it should be mentioned that set 76 may be derived on the basis of parameter 76 merely in such a manner that it merely comprises depth layer of the views the texture layers of which are included within set 74. Other depth layers for which there is no texture layer of the same view in set 74 may not be included into set 76.

The second parameter set 72 also relates to the current picture or a portion of the current picture. For example, the second parameter set 72 may merely be valid for a slice of the current picture or the whole current picture. The second parameter set 72 indicates, and switch 14 of the decoder 10 derives therefrom, for a current coding unit of the current picture, a selected texture reference layer set 78 of texture layers. Set 78 is selected from set 74 and thus is a subset, but not necessarily a proper subset, of set 74. Layers within set 78 may, for example, be entailed to comprise a picture at the current picture's timestamp as, for example, the latter pictures may serve as a reference basis for inter-view texture prediction. That is, the current picture's timestamp pictures of the layers of set 78 represent pictures of other views than the current view from which coding units of the current picture or of the portion of the current portion to which the second parameter set 72 refers, may be predicted by disparity-compensated inter-view texture prediction, for instance. As a side note, however, it should be mentioned that in the case of e.g. contour prediction from texture to depth, where is no inter-view depth prediction, but only the inter-component prediction from texture to depth, 78 may comprise only the current picture itself.

In accordance with the embodiment outlined with respect to FIG. 9, a flag 80 is comprised by data stream 18 merely on a conditional basis. That is, flag 80 which relates to a current coding unit 22, a slice containing the current coding unit or the current picture containing the current coding unit is inserted into data stream 18 by switch 114 on a conditional basis and read from the data stream 18 on a conditional basis by switch 14. The condition when flag 80 is present in data stream 18 depends on the intersection of a potentially available, and thus used, set 82 of depth layers on the one hand and the depth reference layer set 76 on the other hand. Set 82 is, quasi, a set of depth layers having one depth layer for each texture layer of set 78, namely a depth layer for each reference view for which set 78 comprises a texture layer. Layers in set 82 are merely "potentially available" or putative layers comprised by data stream 18 as data stream 18 does not necessarily comprise a depth layer for each of the reference layers for which set 78 comprises a respective texture layer. However, even if each of the members of set 82, i.e. each of the putative depth layers of set 82, is comprised by the depth reference layer set 76 as indicated by the first parameter set 70 which case corresponds to the case that the intersection equals the potentially available set 82, it is not clear whether for each of these layers in set 82 or for each layer of the intersection, there is a corresponding depth picture with a timestamp corresponding to the timestamp of the current texture picture of the current coding unit and accordingly flag 80 is comprised by data stream 18 to indicate whether the depth-to-texture prediction is enabled or disabled. In accordance with the embodiment of FIG. 9, if flag 80 is not present in data stream 18, since not every layer of set 82 is also comprised by set 76, it is clear that at least some of the layers of set 82 do not have any picture in data stream 18 so that flag 80 is not inserted into the data stream by switch 114 and not read from the data stream by switch 14, but rather the flag's value is inferred by switch 14 to indicate disablement of depth-to-texture prediction for the current picture, the current slice or current coding unit, respectively.

In accordance with an embodiment, switch 114 of encoder 100 sets flag 80, if present in data stream 18, to a value indicating enablement of depth-to-texture prediction whenever the equality of the aforementioned intersection with the potentially available set 82 is given and for each of these layers within this intersection and set 82 there is a picture present in the data stream 18 which coincides in timestamp with the current picture and to a value indicating disablement of depth-to-texture prediction otherwise. Alternatively, however, switch 114, or 3D video encoder 100, may decide to signal within flag 80, as present in data stream 18, disablement of depth-to-texture prediction for the current picture, current slice or current coding unit, even if all pictures of the intersection and set 82 of the timestamp of the current picture are coded into the data stream 18 and depth-to-texture prediction could accordingly have been enabled.

The should be noted that the intersection needs not to be explicitly derived in the sense that the layer ID of layers in intersection is collected in an operand array. It suffices if either the layers of either one of sets 76 and 82 is passed through to determine the equality of the intersection with set 82 and 76, for instance. If set 82 is passed through, it may even suffice if set 76 is not completely derived or determined by switch 14/144. Rather it suffices to check whether each member of set 82 is within 76.

It should further be noted that an additional further flag 84 could optionally be present in data stream 18, i.e. could be inserted in data stream 18 by the 3D video encoder 100 and read from data stream 18 by 3D video decoder 10, which completely disables or enables the depth-to-texture prediction at all so that the whole conditional insertion/reading of flag 80 would depend on further flag 84: controlled by flag 84, depth-to-texture prediction would be disabled inevitably if so indicated by flag 84 and merely in case of enablement being signaled by a flag 84, would the conditional insertion/reading of flag 80 take place.

Again, cores 12/122 may additionally support, and switches 14/144 may additionally control, texture-to-depth prediction. In accordance with alternative embodiment, cores 12/122 merely support, and switches 14/144 merely control, texture-to-depth prediction, i.e. without the functionality around depth-to-texture prediction. In so far, the just-outlined functionality would then lead to a 3D video decoder comprising a video decoding core 12 configured to decode a sequence of layers of a video from a data stream using intra-layer prediction, each layer representing depth or texture of a respective one of a plurality of views, the video decoding core supporting, for a layer representing depth of a current view, prediction from layers representing depth of a different view and texture-to-depth prediction from a layer representing texture, and an inter-component prediction switch (14) configured to read a first parameter set from the data stream, the first parameter set relating to a temporal portion of the video relating to a timestamp of a current picture of the layer representing depth of the current view, if an intersection of a potentially available set of one or more layers representing texture of one or more views the depth of which is represented by the layer representing depth of the current view, on the one hand and a texture reference layer set of layers representing texture determined by the first parameter set, on the other hand equals the potentially available set, read a flag from the data stream, the flag relating to the current picture or a portion of the current picture and indicating whether the texture-to-depth prediction is enabled or disabled for the coding units within the current picture or the portion of the current picture, if the intersection is unequal to the potentially available set, then infer the flag relating to the coding units within the current picture or the portion of the current picture as indicating that the texture-to-depth prediction is disabled for the coding units, wherein the video decoding core is configured to be responsive to the flag in order to, depending on the flag, apply or not apply texture-to-depth prediction for a current coding unit among the coding units within the current picture or the portion of the current picture.

A corresponding 3D video encoder would comprise a video encoding core configured to encode a sequence of layers of a video into a data stream using intra-layer prediction, each layer representing depth or texture of a respective one of a plurality of views, the video decoding core supporting, for layers representing depth of a current view, prediction from layers representing depth of a different view and texture-to-depth prediction from a layer representing depth of the current layer, and an inter-component prediction switch configured to insert a first parameter set into the data stream, the first parameter set relating to a temporal portion of the video relating to a timestamp of a current picture of the layer representing depth of the current view, and indicating, for the current picture, a texture reference layer set of layers representing texture, if an intersection of a potentially available set of one or more layers representing texture of one or more views the depth of which is represented by the layer representing depth of the current view, on the one hand and the texture reference layer set, on the other hand equals the potentially available set, deciding whether the texture-to-depth prediction is enabled or disabled for the coding units within the current picture or a portion of the current picture, and inserting a flag into the data stream, the flag relating to the current picture or portion of the current picture and indicating whether the texture-to-depth prediction is enabled or disabled for the coding units within the current picture or the portion of the current picture, and wherein the video encoding core is configured to, depending on the depth-to-texture prediction being enabled or disabled for the current coding unit, apply or not apply texture-to-depth prediction for a current coding unit among the coding units within the current picture or the portion of the current picture.

Figure 10:
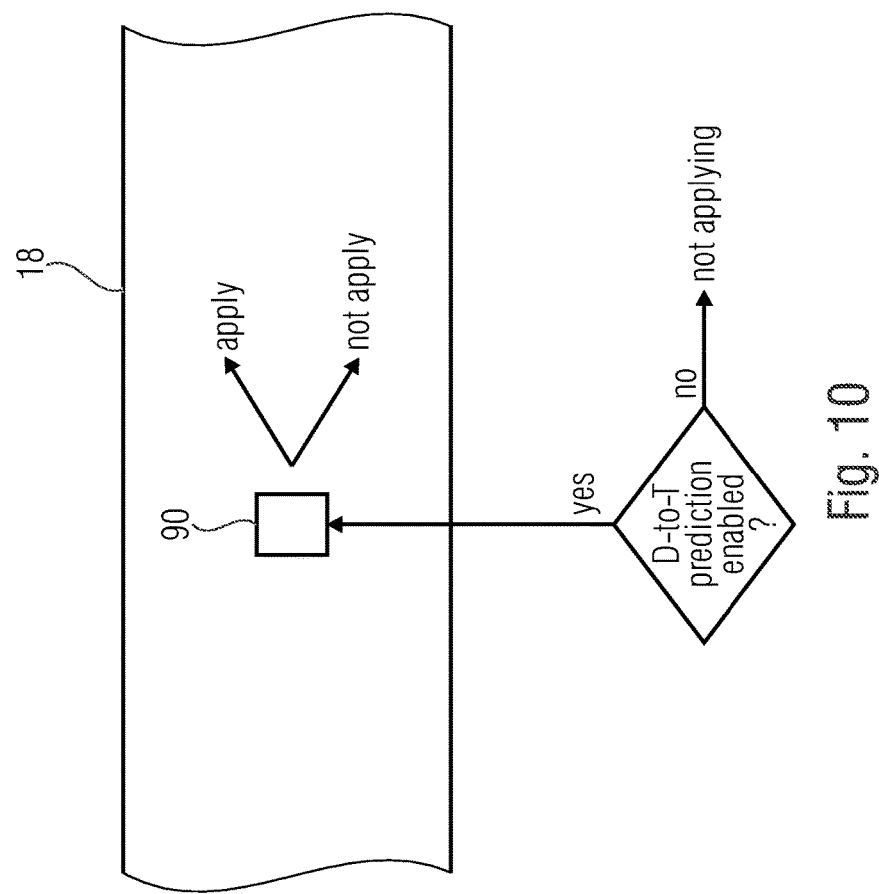
FIG. 10 shows a schematic diagram illustrating a further syntax element contained in the data stream 18 coding unit individually in accordance with a modification of the embodiment of FIG. 9.

Although encoding/decoding cores 12/112 could apply depth-to-texture prediction to any coding unit for which depth-to-texture prediction is enabled by switch 14/114 and optionally further flag 84, the 3D video encoder 100 could alternatively set, for example for aiming at a rate distortion measure or the like, a syntax element 90 individually for each coding unit for which depth-to-texture prediction is theoretically enabled via switch 114 and insert the syntax element 90 for the respective coding unit into data stream 18. This is depicted in FIG. 10. Likewise, switch 14 would, depending on whether for a certain coding unit depth-to-texture prediction is theoretically enabled by flag 80, read the syntax element 90 from data stream 18 so as to determine whether or not depth-to-texture prediction is actually to be applied for the respective coding unit.

It should be noted that the option shown in FIG. 10 involves the 3D video encoder deciding, in accordance with some rate/distortion optimization scheme, coding unit individually whether depth-to-texture prediction is to be applied for a respective coding unit among those for which depth-to-texture prediction is enabled via flag 80. The decision is signaled coding unit individually via syntax element 90. Flag 80 may, as outlined above, be set by switch 114 without any further weight/distortion optimization aim, but simply depending on whether each of the layers in set 82, which is needed to be present also in set 76, comprises a picture having a timestamp of the current picture. The latter circumstance, however, depends on the first and second parameter sets 70 and 72. These parameter sets, in turn, may be the result of user settings or a mixture of user settings and rate/distortion optimization.

FIGS. 11*a* to 11*c* show, exemplarily, how the embodiments of FIGS. 6 to 10 could be built into 3D-HEVC, wherein the concordance between this illustration and the embodiments of FIGS. 6 to 10 is provided by re-using the reference numbers of the latter figures.

In other words, with respect to FIGS. 6 to 10, the following has been described, namely a 3D video decoder comprising a video decoding core, e.g. a 3D-HEVC core, configured to decode, in units of coding units of pictures, a sequence of layers of a video from a data stream using intra-layer prediction, such as temporal (motion compensated) prediction or spatial prediction, each layer representing depth or texture of a respective one of a plurality of views, the video decoding core supporting, for layers representing texture, inter-view texture prediction, such as disparity compensated prediction, from layers representing texture of a different view and depth-to-texture prediction from layers representing depth, an inter-component prediction switch configured to read a beyond-picture scope parameter set in e.g. VPS from the data stream, the beyond-picture scope parameter set relating to a temporal portion of the video, e.g. the whole video, containing a timestamp of a current picture, and derive therefrom, for a current picture of a current layer which represents texture, a texture reference layer set, e.g. TRLs, of layers representing texture and a depth reference layer set, e.g. DRLs, of layers relating to depth, read a picture scope or finer scope parameter set, e.g. slice header, from the data stream, the picture scope or finer scope parameter set relating to a portion, e.g. slice or picture (to be more precise: the "portion" may be greater than the coding unit and thus, the derivation is actually performed for all CUs which might be included in the portion such as a slice, wherein these CUs also include a predetermined, namely the currently processed, CU), of the current picture, and derive therefrom, for the current coding unit of the current picture, contained by the portion of the current picture, a selected texture reference layer set, e.g. TRLs cPic, of layers representing texture from the texture reference layer set, each layer of the selected texture reference layer set comprising a picture at the current picture's timestamp, e.g. and being referenced by way of inter-view texture prediction from the portion of the current picture, and, on the basis of the selected texture reference layer set, an intersection (see "Depth reference layers . . . which are also included in") of a potentially available set (e.g. inCompRefViewIdc) of layers representing depth of views the texture of which is represented by any of the selected texture reference layer set, on the one hand and the depth reference layer set, on the other hand, if the intersection equals the potentially available set (this set could also be named a "set of layers potentially referred in inter-component prediction and representing depth of views . . . "), then read a flag (e.g. in_comp_pred_flag) from the data stream, the flag relating, at least, to the current coding unit ("at least" and e.g. to the whole slice/portion/picture including this CU, i.e. the flag may be transmitted for the CU specifically or for some greater portion including the CU such as for the "portion of the current picture", i.e. in the picture scope or finer scope parameter set) and indicating whether the depth-to-texture prediction is enabled or disabled for the current coding unit, and if the intersection is unequal to the potentially available set, then infer (i.e. skip reading the flag) the flag relating, at least, to the current coding unit as indicating that the depth-to-texture prediction is disabled for the current coding unit, wherein the video decoding core is configured to be responsive to the flag in order to, depending on the flag, apply (e.g. in addition to the intra-layer prediction such as with respect to the intra-layer prediction residual) or not apply depth-to-texture prediction for the current coding unit.

The coding unit may be a prediction unit.

Inter-component prediction may only be disabled for one prediction list.

The selected texture reference layer may implicitly be equal to the texture reference layer set, without parsing the finer scope parameter set.

The inter-component prediction may involve a derivation of motion vectors, disparity vectors, partitioning patterns from depth.

Tools/modes using inter-component prediction may not be available, when the flag is 0 and can thus not be signaled.

Tools/modes may use default values instead of values derived from inter-component prediction, when the flag is 0.

Texture and depth may be swapped.

The selected texture reference layer set may be implicitly derived to contain only the layer of the current picture.

It may be needed that all depth pictures of all layers in the intersection (or for solution 2, all layers in the intersection having the flag equal to 1) are present in the AU.

The enabling of inter-component prediction may depend additionally on flags indicating that tools using inter-component prediction are enabled for the bitstream.

The presence of the flag may also depend on flags indicating that tools using inter-component prediction are enabled for the bitstream.

Figure 12:
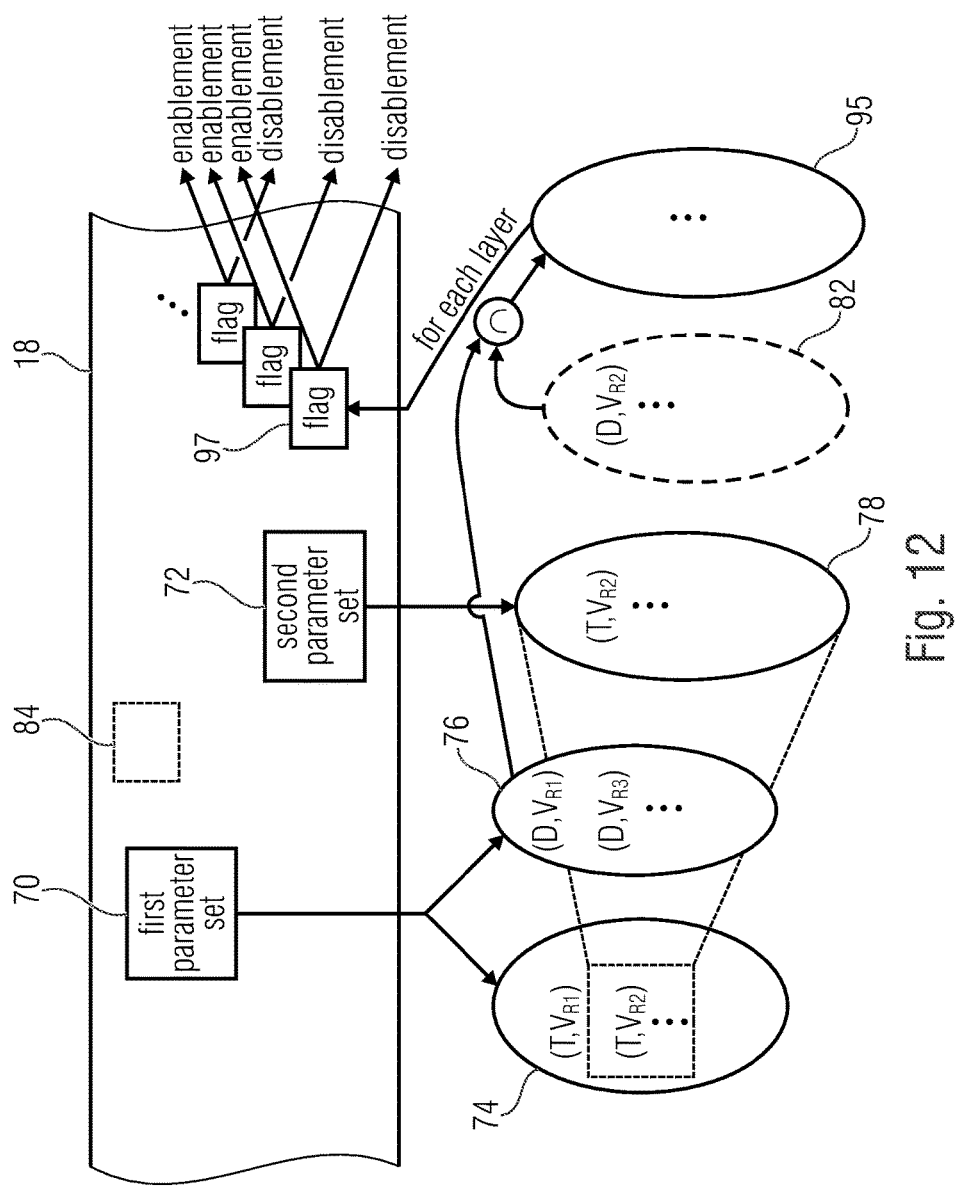
FIG. 12 shows a schematic diagram illustrating an alternative for FIG. 9 in accordance with a second aspect of the present application.

FIG. 12 illustrates an alternative embodiment of 3D video de/encoders of FIGS. 6 and 7 by illustrating an alternative mode of operation of switches 14/114. The embodiment of FIG. 12 relates to the second aspect of the present application. Here, first and second parameter sets 70 and 72 are comprised by the data stream and used by switches 14/114 as before, but instead of conditionally spending a fag 80 in data stream 18 merely in case of the intersection set 95 between sets 76 and 82 equaling set 82, the embodiment of FIG. 12 involves switch 114 inserting a flag 97 per layer of intersection set 95. According to this embodiment, it is feasible to enable depth-to-texture prediction individually with respect to each depth layer of set 82 so that for coding units to which the second parameter set 72 relates, such as all coding units of the current picture, depth-to-texture prediction may be applied at least with respect to those depth reference layers of intersection 95 for which the respective flag 92 in data stream 18 signals enablement. All other layers of set 82, i.e. all layers not comprised by set 76 or comprised also by set 76, but for which the respective flag 97 signals disablement, are not available for depth-to-texture prediction as far as the coding units to which the second parameter sets 72 relates, and accordingly, with respect to those layers depth-to-texture prediction is disabled.

In other words, with respect to above Figs. the following has been described, namely a 3D video decoder comprising a video decoding core, e.g. a 3D-HEVC core, configured to decode, in units of coding units of pictures, a sequence of layers of a video from a data stream using intra-layer prediction, such as temporal (motion compensated) prediction or spatial prediction, each layer representing depth or texture of a respective one of a plurality of views, the video decoding core supporting, for layers representing texture, inter-view texture prediction, such as disparity compensated prediction, from layers representing texture of a different view and depth-to-texture prediction from layers representing depth, an inter-component prediction switch configured to read a beyond-picture scope parameter set in e.g. VPS from the data stream, the beyond-picture scope parameter set relating to a temporal portion of the video, and derive therefrom, for a current picture of a current layer which represents texture, the timestamp of which is contained within the temporal portion, a texture reference layer set, e.g. TRLs, of layers representing texture and a depth reference layer set, e.g. DRLs, of layers relating to depth, read a picture scope or finer scope parameter set, e.g. slice header, from the data stream, the picture scope or finer scope parameter set relating to a portion, e.g. slice or picture, of the current picture, and derive therefrom, for a current coding unit of the current picture, contained by the portion of the current picture, a selected texture reference layer set, e.g. TRLs cPic, of layers representing texture from the texture reference layer set, each layer of the selected texture reference layer set comprising a picture at the current picture's timestamp, e.g. and being referenced by way of inter-view texture prediction from the portion of the current picture, and, on the basis of the selected texture reference layer set, an intersection (see "depth reference layers . . . which are also included in") of a potentially available set (e.g. inCompRefViewIdc) of layers representing depth of views the texture of which is represented by any of the selected texture reference layer set, on the one hand and the depth reference layer set, on the other hand, read, per layer of the intersection, a flag (e.g. in_comp_pred_flag) from the data stream, the flag relating, at least, to the current coding unit ("at least" and e.g. to the whole slice/portion including this CU) and indicating whether the depth-to-texture prediction using the respective layer as depth-to-texture prediction reference is enabled or disabled for the current coding unit, and wherein the video decoding core is configured to be responsive to the flags for the layers of the intersection in order to, depending on the flags, apply (e.g. in addition to the intra-layer prediction such as with respect to the intra-layer prediction residual) or not apply depth-to-texture prediction using one or more of the layers of the intersection as depth-to-texture prediction reference for the current coding unit. For any layer of the potentially available set not contained in the intersection, a corresponding flag relating, at least, to the current coding unit may be inferred as indicating that the depth-to-texture prediction using the respective layer as depth-to-texture prediction reference is disabled for the current coding unit and the video decoding core would be configured to, accordingly, not apply depth-to-texture prediction using any layer of the potentially available set not contained in the intersection. Which depth reference layer is actually used, may be derived or determined on CU level. This may depend on the coding of neighboring blocks of the texture CU. For example, in case of a neighboring block using inter-view prediction, the view referenced by this neighbor could be used.

The coding unit may be a prediction unit.

The inter-component prediction may only be disabled for one prediction list.

The texture reference layer may implicitly be equal to the texture reference layer set, without parsing the finer scope parameter set.

The inter-component prediction may involve a derivation of motion vectors, disparity vectors, partitioning patterns from depth.

Tools/modes using inter-component prediction may not be available, when the flag is 0 and can thus not be signaled.

Tools/modes may use default values instead of values derived from inter-component prediction, when the flag is 0.

Texture and depth may be swapped.

The selected texture reference layer set may be implicitly derived to contain only the layer of the current picture.

It may be needed that all depth pictures of all layers in the intersection (or for solution 2, all layers in the intersection having the flag equal to 1) are present in the AU.

The enabling of inter-component prediction may depend additionally on flags indicating that tools using inter-component prediction are enabled for the bitstream.

The presence of the flag may also depend on flags indicating that tools using inter-component prediction are enabled for the bitstream.

Figure 13:
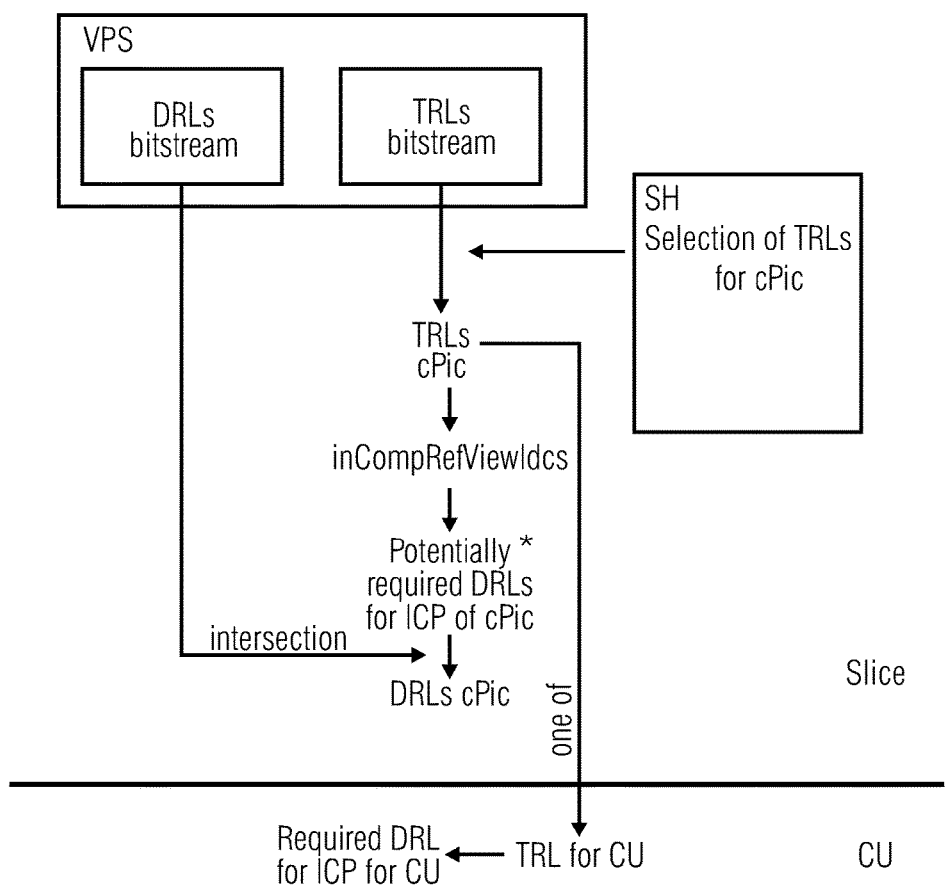
FIG. 13 illustrates schematically solution 1 of FIG. 4.
Figure 14:
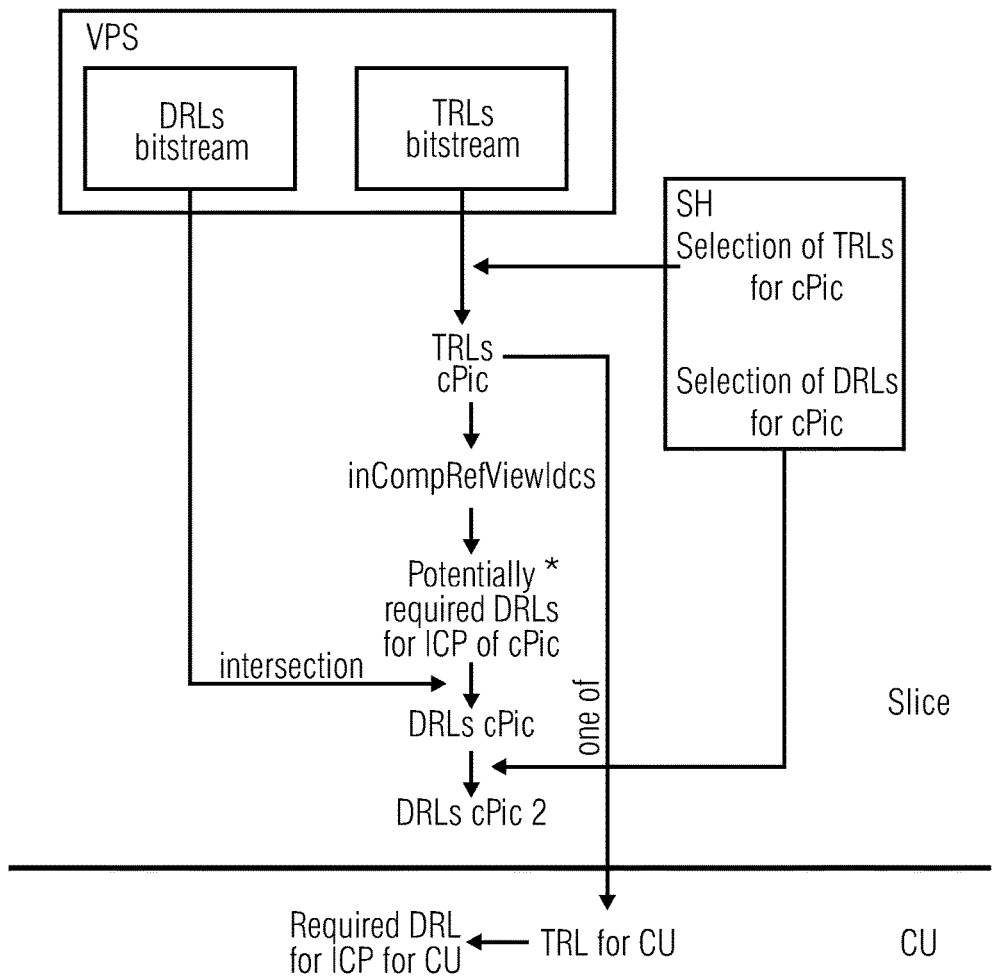
FIG. 14 illustrates schematically the solution 2 of FIG. 5.
Figure 15:
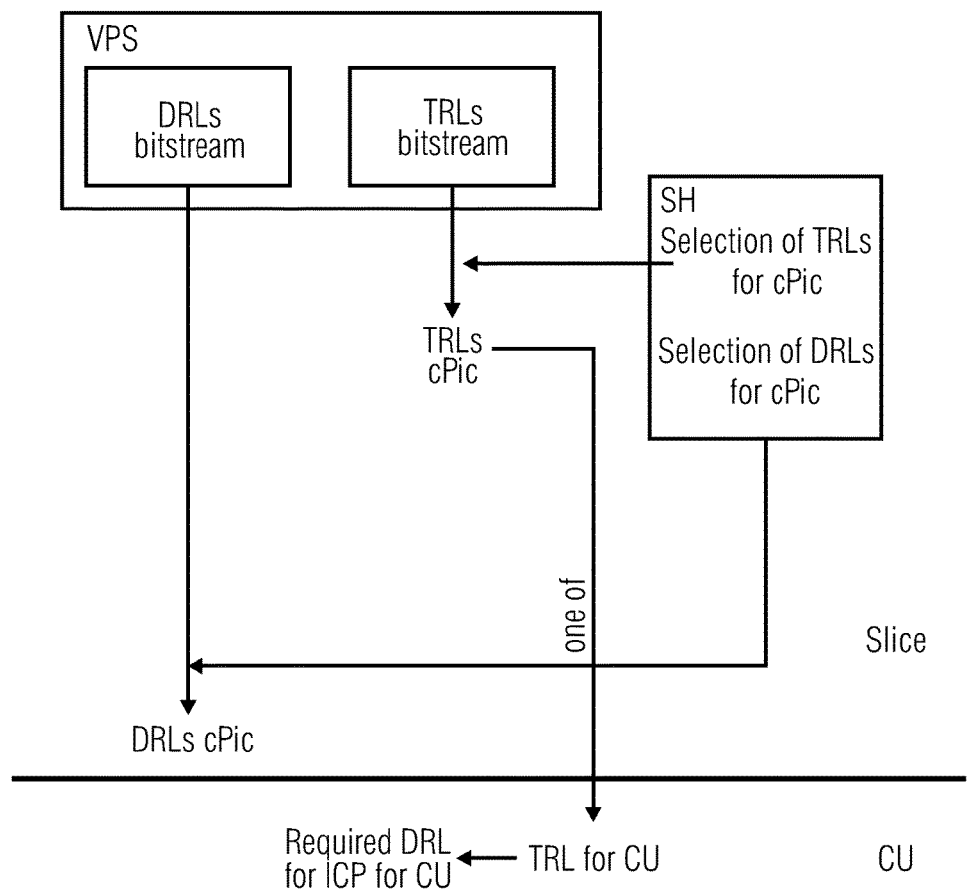
FIG. 15 illustrates an alternative approach discussed in [1]

The derivation of inter-component reference layers for prediction from depth to texture is again illustrated with respect to FIGS. 13 and 14.

In FIG. 13 derivation of layers used for inter-component prediction of a current layer are illustrated.

FIG. 13 is an example for both current design and solution 1. TRL: Texture reference layer, DRL: Depth reference layer, cPic: current picture, ICP: inter-component prediction TRLs bitstream: The texture reference layers for the current layer as signaled in the VPS.

DRLs bitstream: The depth reference layers for the current layer as signaled in the VPS.

TRLs cPic: The texture reference layers for the current picture. A subset of TRLs bitstream as indicated in the SH. (May be subsets layers of TRLs bitstream, which have a picture included in the current AU. Could be also equal to TRLs bitstream.)

inCompRefViewIdc: List that include the views of all layers included in TRLs cPic.

Potentially used DRLs for ICP of cPic: Depth layers of views in inCompRefViewIdc. Some of them might not be present.

DRLs cPic: Depth reference layers from "Potentially used DRLs for ICP of cPic", which are also included in DRLs bitstream. (Thus only the available and present DRLs).

TRL for CU: A texture reference layer used by the current CU. Selected by CU syntax elements among TRLs cPic.

Used DRL for ICP for CU: Depth layer of the view including TRL for CU.

In the current 3D-HEVC design, inter-component prediction is only enabled for a picture when "Potentially used DRLs for ICP of cPic" is equal to DRLs cPic.

In accordance with solution 1, when "Potentially used DRLs for ICP of cPic" is equal to "DRLs cPic", a single flag is signaled in the slice header, indicating whether residual prediction is enabled for the picture. Thus, when a picture of layer "Used DRL for ICP for CU" for one or more CUs is not in "DRLs cPic", inter-component prediction can be disabled for the entire slice. When "Potentially used DRLs for ICP of cPic" is not equal to "DRLs cPic", residual prediction is disabled for the picture.

In accordance with solution 2, for each layer in "DRLs cPic" a flag is signaled in the SH, indicating if a picture of this layer is included in the current AU. If this is true the layer is included in "DRLs cPic 2". At CU level inter-component prediction is only enabled when the "Used DRL for ICP for CU" is in "DRLs cPic 2".

For the sake of completeness, it is also noted that a further alternative approach is known from JCT3V-G0048. It is illustrated in FIG. 14:

DRLs bitstream: The depth reference layers for the current layer as signaled in the VPS.

DRLs cPic: A subset of DRLs bitstream as indicated in the SH. (May be subsets layers of DRLs bitstream, which have a picture included in the current AU. Could be also equal to DRLs bitstream, when all are included)

At CU level inter-component prediction is only enabled when the "Used DRL for ICP for CU" is in "DRLs cPic".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded data stream or signal can be stored on a digital storage medium or can be transmitted on a transmission medium such as a wireless transmission medium or a wired transmission medium such as the Internet. Where ever the insertion or encoding of some information into a data stream has been described, this description is concurrently to be understood as a disclosure that the resulting data stream comprises the respective information, syntax element of flag or so forth.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

JCT3V-G0048 3D-HEVC HLS: On inter-component reference pictures Y.-L. Chang, Y.-W. Chen, J.-L. Lin, Y.-P. Tsai, S. Lei (MediaTek).

G. Tech, K. Wegner, Y. Chen, S. Yea, "3D-HEVC Draft Text 6"; JCT3V-J1001

The invention claimed is:

1. 3D video decoder comprising
a video decoding core configured to decode a sequence of layers of a video from a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth,
an inter-component prediction switch configured to
read a first parameter set from the data stream, the first parameter set relating to a temporal portion of the video relating to a timestamp of a current picture, and derive therefrom, for a current picture of a current layer which represents texture, a texture reference layer set of layers representing texture,
read a second parameter set from the data stream, the second parameter set relating to the current picture or a portion of the current picture, and derive therefrom, for coding units within the current picture or the portion of the current picture, a selected texture reference layer set of layers representing texture from the texture reference layer set,
if an intersection of
a potentially available set of layers representing depth of views the texture of which is represented by any of the selected texture reference layer set, on the one hand and
a depth reference layer set of layers representing depth determined by the first parameter set, on the other hand
equals the potentially available set, then read a flag from the data stream, the flag relating to the current picture or the portion of the current picture and indicating whether the depth-to-texture prediction is enabled or disabled for the coding units within the current picture or the portion of the current picture, and if the intersection is unequal to the potentially available set, then infer the flag relating to the coding units within the current picture or the portion of the current picture as indicating that the depth-to-texture prediction is disabled for the coding units, wherein the video decoding core is configured to be responsive to the flag in order to, depending on the flag, apply or not apply depth-to-texture prediction for a current coding unit among the coding units within the current picture or the portion of the current picture.

2. 3D video decoder according to claim 1, wherein the flag and the second parameter set relate to a slice of the current picture.

3. 3D video decoder according to claim 1, wherein each layer of the selected texture reference layer set comprises a picture at the current picture's time stamp.

4. 3D video decoder according to claim 1, wherein the video decoding core is configured to support temporal prediction and/or spatial prediction in intra-layer prediction.

5. 3D video decoder according to claim 1, wherein the video decoding core is configured to, in applying depth-to-texture prediction for the current coding unit, derive, from a in terms of disparity corresponding portion of a depth reference picture of the intersection, a partition of the current coding unit into more than one partition for separate prediction, and/or a motion vector for decoding the current coding unit, and/or a disparity vector for decoding the current coding unit.

6. 3D video decoder according to claim 1, wherein the video decoding core is configured to depending on the flag, derive a partition of the current coding unit into more than one partition from an in terms of disparity corresponding portion of a depth reference picture of the intersection or dividing the current coding unit into more than one partition of equal size and shape, and/or depending on the flag, predict a motion vector for decoding the current coding unit from a motion vector candidate list comprising or excluding a motion vector derived from a in terms of disparity corresponding portion of a depth reference picture of the intersection, and/or depending on the flag, predict a disparity vector for decoding the current coding unit from a disparity vector candidate list comprising or excluding a disparity vector derived from a in terms of disparity corresponding portion of a depth reference picture of the intersection.

7. 3D video decoder according to claim 1, wherein the video decoding core is configured to applying depth-to-texture prediction for the current coding unit depending on the flag by if the flag indicates that the depth-to-texture prediction is enabled for the current coding unit, reading a syntax element specific for the current coding unit from the data stream, the syntax element signaling whether the depth-to-texture prediction is to be applied to the current coding unit or not, if the flag indicates the depth-to-texture prediction is disabled for the current coding unit, skipping reading the syntax element from the data stream, and apply the depth-to-texture prediction for the current coding unit the flag indicates that the depth-to-texture prediction is enabled for the current coding unit and if the syntax element indicates that the depth-to-texture prediction is to be applied to the current coding unit.

8. 3D video decoder according to claim 1, wherein the video decoding core is configured to, in inter-view texture prediction from layers representing texture of a different view, perform disparity compensated prediction.

9. 3D video decoder according to claim 1, wherein the first parameter set comprises a scope in the data stream so that the temporal portion of the video the first parameter set encompasses the video as a whole or a sequence of pictures.

10. 3D video decoder according to claim 1, wherein the inter-component prediction switch is configured to read the flag from a slice header of a slice of the current picture.

11. 3D video decoder according to claim 1, wherein the inter-component prediction switch is configured to act commonly for two hypotheses in case of the current picture being a bi-predicted picture.

12. 3D video decoder according to claim 1, configured to, if the depth-to-texture prediction is enabled for the current coding unit, detect picture loss if any of the pictures of the intersection not being coded in the data stream.

13. 3D video decoder according to claim 1, further configured to disable, irrespective of the inter-component prediction switch, the depth-to-texture prediction of the current coding unit responsive to a further flag in the data stream.

14. 3D video decoder according to claim 1, wherein the inter-component prediction switch is configured to suppress reading the flag in case of the depth-to-texture prediction of the current coding unit being disabled by a further flag in the data stream.

15. 3D video decoder according to claim 1, wherein the video decoding core also supports texture-to-depth prediction enabled and disabled by the inter-component prediction switch.

16. 3D video decoder according to claim 1, wherein the inter-component switch is configured to use also a temporal ID of the current picture, corresponding to the timestamp of the current picture, in order to derive the texture reference layer set of layers representing texture from the first parameter set.

17. 3D video encoder comprising a video encoding core configured to encode a sequence of layers of a video into a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, an inter-component prediction switch configured to insert a first parameter set into the data stream, the first parameter set relating to a temporal portion of the video relating to a timestamp of a current picture, and indicating, for a current picture of a current layer which represents texture, a texture reference layer set of layers representing texture and a depth reference layer set of layers representing depth, insert a second parameter set into the data stream, the second parameter set relating to the current picture or a portion of the current picture, and indicating, for coding units within the current picture or a portion of the current picture, a selected texture reference layer set of layers representing texture from the texture reference layer set, if an intersection of a potentially available set of layers representing depth of views the texture of which is represented by any of the selected texture reference layer set, on the one hand and the depth reference layer set, on the other hand, equals the potentially available set, then deciding whether the depth-to-texture prediction is enabled or disabled for the current picture or the portion of the picture and inserting a flag into the data stream, the flag relating to the current picture or portion of the current picture and indicating whether the depth-to-texture prediction is enabled or disabled for the coding units within the current picture or the portion of the current picture, and if the intersection is unequal to the potentially available set, suppressing inserting the flag relating to the coding units within the current picture or the portion of the current picture and disabling the depth-to-texture prediction for the coding units, wherein the video encoding core is configured to, depending on the depth-to-texture prediction being enabled or disabled for the current coding unit, apply or not apply depth-to-texture prediction for a current coding unit among the coding units within the current picture or the portion of the current picture.

18. 3D video encoder according to claim 17, wherein the flag and the second parameter set relate to a slice of the current picture.

19. 3D video encoder according to claim 17, wherein each layer of the selected texture reference layer set comprises a picture at the current picture's time stamp.

20. 3D video encoder according to claim 17, wherein the video encoding core is configured to support temporal prediction and/or spatial prediction in intra-layer prediction.

21. 3D video encoder according to claim 17, wherein the video encoding core is configured to, in applying depth-to-texture prediction for the current coding unit, derive, from a in terms of disparity corresponding portion of a depth reference picture of the intersection, a partition of the current coding unit into more than one partition separately predicted, and/or a motion vector for decoding the current coding unit, and/or a disparity vector for decoding the current coding unit.

22. 3D video encoder according to claim 17, wherein the video encoding core is configured to depending on the flag, derive a partition of the current coding unit into more than one partition from a in terms of disparity corresponding portion of a depth reference picture of the intersection or dividing the current coding unit into more than one partition of equal size and shape, and/or depending on the flag, predict a motion vector for decoding the current coding unit from a motion vector candidate list comprising or excluding a motion vector derived from a in terms of disparity corresponding portion of a depth reference picture of the intersection, and/or depending on the flag, predict a disparity vector for decoding the current coding unit from a disparity vector candidate list comprising or excluding a disparity vector derived from a in terms of disparity corresponding portion of a depth reference picture of the intersection.

23. 3D video encoder according to claim 17, wherein the video encoding core is configured to apply depth-to-texture prediction for the current coding unit depending on the flag by if the depth-to-texture prediction is enabled for the current coding unit, decoding whether the depth-to-texture prediction is to be applied to the current coding unit or not, and inserting a syntax element specific for the current coding unit into the data stream, the syntax element signaling whether the depth-to-texture prediction is to be applied to the current coding unit or not, if the depth-to-texture prediction is disabled for the current coding unit, skipping inserting the syntax element into the data stream, and apply the depth-to-texture prediction for the current coding unit if the depth-to-texture prediction is enabled for the current coding unit and the depth-to-texture prediction is to be applied to the current coding unit.

24. 3D video encoder according to claim 17, wherein the video encoding core is configured to, in inter-view texture prediction from layers representing texture of a different view, perform disparity compensated prediction.

25. 3D video encoder according to claim 17, wherein the first parameter set comprises a scope in the data stream so that the temporal portion of the video the first parameter set encompasses the video as a whole or a sequence of pictures.

26. 3D video encoder according to claim 17, wherein the inter-component prediction switch is configured to insert the flag into a slice header of a slice of the current picture.

27. 3D video encoder according to claim 17, wherein the inter-component prediction switch is configured to read the flag specifically for the current picture.

28. 3D video encoder according to claim 17, wherein the inter-component prediction switch is configured to act commonly for two hypotheses in case of the current picture being a bi-predicted picture.

29. 3D video encoder according to claim 17, further configured to disable, irrespective of the inter-component prediction switch, the depth-to-texture prediction of the current coding unit and signal the disablement by way of a further flag in the data stream.

30. 3D video encoder according to claim 17, wherein the inter-component prediction switch is configured to suppress reading the flag in case of the depth-to-texture prediction of the current coding unit being disabled by a further flag in the data stream.

31. 3D video encoder according to claim 17, wherein the video decoding core also supports texture-to-depth prediction enabled and disabled by the inter-component prediction switch.

32. 3D video encoder according to claim 17, wherein the inter-component switch is configured so that the first parameter set indicates the texture reference layer set of layers representing texture in a manner involving a temporal ID of the current picture, corresponding to the timestamp of the current picture, in order to derive.

33. 3D video decoder comprising a video decoding core configured to decode a sequence of layers of a video from a data stream using intra-layer prediction, each layer representing depth or texture of a respective one of a plurality of views, the video decoding core supporting, for a layer representing depth of a current view, prediction from layers representing depth of a different view and texture-to-depth prediction from a layer representing texture, an inter-component prediction switch configured to read a first parameter set from the data stream, the first parameter set relating to a temporal portion of the video relating to a timestamp of a current picture of the layer representing depth of the current view, if an intersection of a potentially available set of one or more layers representing texture of one or more views the depth of which is represented by the layer representing depth of the current view, on the one hand and a texture reference layer set of layers representing texture determined by the first parameter set, on the other hand equals the potentially available set, read a flag from the data stream, the flag relating to the current picture or a portion of the current picture and indicating whether the texture-to-depth prediction is enabled or disabled for the coding units within the current picture or the portion of the current picture, if the intersection is unequal to the potentially available set, then infer the flag relating to the coding units within the current picture or the portion of the current picture as indicating that the texture-to-depth prediction is disabled for the coding units, wherein the video decoding core is configured to be responsive to the flag in order to, depending on the flag, apply or not apply texture-to-depth prediction for a current coding unit among the coding units within the current picture or the portion of the current picture.

34. 3D video decoder according to claim 33, further configured according to claim 1.

35. 3D video encoder comprising a video encoding core configured to encode a sequence of layers of a video into a data stream using intra-layer prediction, each layer representing depth or texture of a respective one of a plurality of views, the video decoding core supporting, for layers representing depth of a current view, prediction from layers representing depth of a different view and texture-to-depth prediction from a layer representing depth of the current layer, an inter-component prediction switch configured to insert a first parameter set into the data stream, the first parameter set relating to a temporal portion of the video relating to a timestamp of a current picture of the layer representing depth of the current view, and indicating, for the current picture, a texture reference layer set of layers representing texture, if an intersection of a potentially available set of one or more layers representing texture of one or more views the depth of which is represented by the layer representing depth of the current view, on the one hand and the texture reference layer set, on the other hand equals the potentially available set, deciding whether the texture-to-depth prediction is enabled or disabled for the coding units within the current picture or a portion of the current picture, and inserting a flag into the data stream, the flag relating to the current picture or portion of the current picture and indicating whether the texture-to-depth prediction is enabled or disabled for the coding units within the current picture or the portion of the current picture, and wherein the video encoding core is configured to, depending on the depth-to-texture prediction being enabled or disabled for the current coding unit, apply or not apply texture-to-depth prediction for a current coding unit among the coding units within the current picture or the portion of the current picture.

36. Method for 3D video decoding, comprising decoding, performed by a video decoding core, a sequence of layers of a video from a data stream using intra-layer prediction, each layer representing depth or texture of a respective one of a plurality of views, the video decoding core supporting, for layers representing texture, inter-view texture prediction from layers representing texture of a different view, reading a first parameter set from the data stream, the first parameter set relating to a temporal portion of the video relating to a timestamp of a current picture, and derive therefrom, for a current picture of a current layer which represents texture, a texture reference layer set of layers representing texture and a depth reference layer set of layers representing depth, reading a second parameter set from the data stream, the second parameter set relating to the current picture or a portion of the current picture, and derive therefrom, for coding units within the current picture or the portion of the current picture, a selected texture reference layer set of layers representing texture from the texture reference layer set, each layer of the selected texture reference layer set, if an intersection of a potentially available set of layers representing depth of views the texture of which is represented by any of the selected texture reference layer set, on the one hand and a depth reference layer set of layers representing depth determined by the first parameter set, on the other hand equals the potentially available set, then reading a flag from the data stream, the flag relating to the current picture or the portion of the current picture and indicating whether the depth-to-texture prediction is enabled or disabled for the coding units within the current picture or the portion of the current picture, and if the intersection is unequal to the potentially available set, then inferring the flag relating to the coding units within the current picture or the portion of the current picture as indicating that the depth-to-texture prediction is disabled for the coding units, wherein the video decoding core, depending on the flag, applies or not applies depth-to-texture prediction for a current coding unit among the coding units within the current picture or the portion of the current picture.

37. Method for 3D video encoding, comprising encoding, performed by a video encoding core, a sequence of layers of a video into a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, inserting a first parameter set into the data stream, the first parameter set relating to a temporal portion of the video relating to a timestamp of a current picture, and indicating, for a current picture of a current layer which represents texture, a texture reference layer set of layers representing texture and a depth reference layer set of layers relating to depth, inserting a second parameter set into the data stream, the second parameter set relating to the current picture or a portion of the current picture, and indicating, for coding units within the current picture or a portion of the current picture, a selected texture reference layer set of layers representing texture from the texture reference layer set, if an intersection of a potentially available set of layers representing depth of views the texture of which is represented by any of the selected texture reference layer set, on the one hand and the depth reference layer set, on the other hand, equals the potentially available set, then deciding whether the depth-to-texture prediction is enabled or disabled for the current picture or the portion of the picture and inserting a flag into the data stream, the flag relating to the current picture or portion of the current picture and indicating whether the depth-to-texture prediction is enabled or disabled for the coding units within the current picture or the portion of the current picture, and if the intersection is unequal to the potentially available set, suppressing inserting the flag relating to the coding units within the current picture or the portion of the current picture and disabling the depth-to-texture prediction for the coding units, wherein the video encoding core, depending on the depth-to-texture prediction being enabled or disabled for the current coding unit, applies or not applies depth-to-texture prediction for a current coding unit among the coding units within the current picture or the portion of the current picture.

38. A non-transitory digital storage medium having a computer program stored thereon to perform the method for 3D video decoding, the method comprising decoding, performed by a video decoding core, a sequence of layers of a video from a data stream using intra-layer prediction, each layer representing depth or texture of a respective one of a plurality of views, the video decoding core supporting, for layers representing texture, inter-view texture prediction from layers representing texture of a different view, reading a first parameter set from the data stream, the first parameter set relating to a temporal portion of the video relating to a timestamp of a current picture, and derive therefrom, for a current picture of a current layer which represents texture, a texture reference layer set of layers representing texture and a depth reference layer set of layers representing depth, reading a second parameter set from the data stream, the second parameter set relating to the current picture or a portion of the current picture, and derive therefrom, for coding units within the current picture or the portion of the current picture, a selected texture reference layer set of layers representing texture from the texture reference layer set, each layer of the selected texture reference layer set, if an intersection of
a potentially available set of layers representing depth of views the texture of which is represented by any of the selected texture reference layer set, on the one hand and a depth reference layer set of layers representing depth determined by the first parameter set, on the other hand
equals the potentially available set, then reading a flag from the data stream, the flag relating to the current picture or the portion of the current picture and indicating whether the depth-to-texture prediction is enabled or disabled for the coding units within the current picture or the portion of the current picture, and
if the intersection is unequal to the potentially available set, then inferring the flag relating to the coding units within the current picture or the portion of the current picture as indicating that the depth-to-texture prediction is disabled for the coding units, wherein the video decoding core, depending on the flag, applies or not applies depth-to-texture prediction for a current coding unit among the coding units within the current picture or the portion of the current picture, when said computer program is run by a computer.

39. A non-transitory digital storage medium having a computer program stored thereon to perform the method for 3D video encoding, the method comprising encoding, performed by a video encoding core, a sequence of layers of a video into a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, inserting a first parameter set into the data stream, the first parameter set relating to a temporal portion of the video relating to a timestamp of a current picture, and indicating, for a current picture of a current layer which represents texture, a texture reference layer set of layers representing texture and a depth reference layer set of layers relating to depth, inserting a second parameter set into the data stream, the second parameter set relating to the current picture or a portion of the current picture, and indicating, for coding units within the current picture or a portion of the current picture, a selected texture reference layer set of layers representing texture from the texture reference layer set, if an intersection of a potentially available set of layers representing depth of views the texture of which is represented by any of the selected texture reference layer set, on the one hand and the depth reference layer set, on the other hand, equals the potentially available set, then deciding whether the depth-to-texture prediction is enabled or disabled for the current picture or the portion of the picture and inserting a flag into the data stream, the flag relating to the current picture or portion of the current picture and indicating whether the depth-to-texture prediction is enabled or disabled for the coding units within the current picture or the portion of the current picture, and if the intersection is unequal to the potentially available set, suppressing inserting the flag relating to the coding units within the current picture or the portion of the current picture and disabling the depth-to-texture prediction for the coding units, wherein the video encoding core, depending on the depth-to-texture prediction being enabled or disabled for the current coding unit, applies or not applies depth-to-texture prediction for a current coding unit among the coding units within the current picture or the portion of the current picture, when said computer program is run by a computer.

40. Digital storage medium having stored thereon a data stream generated by a method for 3D video encoding, the method comprising encoding, performed by a video encoding core, a sequence of layers of a video into a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, inserting a first parameter set into the data stream, the first parameter set relating to a temporal portion of the video relating to a timestamp of a current picture, and indicating, for a current picture of a current layer which represents texture, a texture reference layer set of layers representing texture and a depth reference layer set of layers relating to depth, inserting a second parameter set into the data stream, the second parameter set relating to the current picture or a portion of the current picture, and indicating, for coding units within the current picture or a portion of the current picture, a selected texture reference layer set of layers representing texture from the texture reference layer set, if an intersection of a potentially available set of layers representing depth of views the texture of which is represented by any of the selected texture reference layer set, on the one hand and the depth reference layer set, on the other hand, equals the potentially available set, then deciding whether the depth-to-texture prediction is enabled or disabled for the current picture or the portion of the picture and inserting a flag into the data stream, the flag relating to the current picture or portion of the current picture and indicating whether the depth-to-texture prediction is enabled or disabled for the coding units within the current picture or the portion of the current picture, and if the intersection is unequal to the potentially available set, suppressing inserting the flag relating to the coding units within the current picture or the portion of the current picture and disabling the depth-to-texture prediction for the coding units, wherein the video encoding core, depending on the depth-to-texture prediction being enabled or disabled for the current coding unit, applies or not applies depth-to-texture prediction for a current coding unit among the coding units within the current picture or the portion of the current picture.

41. 3D video decoder comprising a video decoding core configured to decode a sequence of layers of a video from a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, an inter-component prediction switch configured to read a first parameter set from the data stream, the first parameter set relating to a temporal portion of the video, and derive therefrom, for a current picture of a current layer which represents texture, the timestamp of which is comprised within the temporal portion, a texture reference layer set of layers representing texture, read a second parameter set from the data stream, the second parameter set relating to a portion of the current picture or a portion of the current picture, and derive therefrom, for a current coding unit of the current picture, a selected texture reference layer set of layers representing texture from the texture reference layer set, each layer of the selected texture reference layer set comprising a picture at the current picture's timestamp, and, on the basis of the selected texture reference layer set, an intersection of a potentially available set of layers representing depth of views the texture of which is represented by any of the selected texture reference layer set, on the one hand and a depth reference layer set of layers representing depth determined by the first parameter set, on the other hand, read, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video decoding core is configured to be responsive to the flags for the layers of the intersection in order to, depending on the flags, apply or not apply depth-to-texture prediction using one or more of the layers of the intersection as depth-to-texture prediction reference for the current coding unit.

42. 3D video encoder comprising a video encoding core configured to encode a sequence of layers of a video into a data stream using intra-layer prediction, each layer representing depth or texture of a respective one of a plurality of views, the video encoding core supporting, for layers representing texture, inter-view texture prediction from layers representing texture of a different view and depth-to-texture prediction from layers representing depth, an inter-component prediction switch configured to insert a first parameter set into the data stream, the first parameter set relating to a temporal portion of the video, and indicating, for a current picture of a current layer which represents texture, the timestamp of which is comprised within the temporal portion, a texture reference layer set of layers representing texture and a depth reference layer set of layers relating to depth, insert a second parameter set from the data stream, the second parameter set relating to a portion of the current picture or a portion of the current picture, and indicating, for a current coding unit of the current picture, a selected texture reference layer set of layers representing texture from the texture reference layer set, each layer of the selected texture reference layer set comprising a picture at the current picture's timestamp, derive an intersection of a potentially available set of layers representing depth of views the texture of which is represented by any of the selected texture reference layer set, on the one hand and the depth reference layer set, on the other hand, insert, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video encoding core is configured to, depending on whether the depth-to-texture prediction using the layers of the intersection as depth-to-texture prediction reference is enabled or disabled for the current coding unit, apply or not apply depth-to-texture prediction using the layers of the intersection as depth-to-texture prediction reference for the current coding unit.

43. Method for 3D video decoding, comprising decoding, performed by a video decoding core, a sequence of layers of a video from a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, reading a first parameter set from the data stream, the first parameter set relating to a temporal portion of the video, and derive therefrom, for a current picture of a current layer which represents texture, the timestamp of which is comprised within the temporal portion, a texture reference layer set of layers representing texture and a depth reference layer set of layers relating to depth, reading a second parameter set from the data stream, the second parameter set relating to a portion of the current picture or a portion of the current picture, and derive therefrom, for a current coding unit of the current picture, a selected texture reference layer set of layers representing texture from the texture reference layer set, each layer of the selected texture reference layer set comprising a picture at the current picture's timestamp, and, on the basis of the selected texture reference layer set, an intersection of a potentially available set of layers representing depth of views the texture of which is represented by any of the selected texture reference layer set, on the one hand and the depth reference layer set, on the other hand, reading, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video decoding core depending on the flags for the layers of the intersection applies or not applies depth-to-texture prediction using one or more of the layers of the intersection as depth-to-texture prediction reference for the current coding unit.

44. Method for 3D video encoding, comprising

Encoding, performed by a video encoding core, a sequence of layers of a video into a data stream using intra-layer prediction, each layer representing depth or texture of a respective one of a plurality of views, the video encoding core supporting, for layers representing texture, inter-view texture prediction from layers representing texture of a different view and depth-to-texture prediction from layers representing depth, inserting a first parameter set into the data stream, the first parameter set relating to a temporal portion of the video, and indicating, for a current picture of a current layer which represents texture, the timestamp of which is comprised within the temporal portion, a texture reference layer set of layers representing texture and a depth reference layer set of layers relating to depth, inserting a second parameter set from the data stream, the second parameter set relating to a portion of the current picture or a portion of the current picture, and indicating, for a current coding unit of the current picture, a selected texture reference layer set of layers representing texture from the texture reference layer set, each layer of the selected texture reference layer set comprising a picture at the current picture's timestamp, deriving an intersection of a potentially available set of layers representing depth of views the texture of which is represented by any of the selected texture reference layer set, on the one hand and the depth reference layer set, on the other hand, inserting, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video encoding core, depending on whether the depth-to-texture prediction using the layers of the intersection as depth-to-texture prediction reference is enabled or disabled for the current coding unit, applies or not applies depth-to-texture prediction using the layers of the intersection as depth-to-texture prediction reference for the current coding unit.

45. A non-transitory digital storage medium having a computer program stored thereon to perform the method for 3D video decoding, the method comprising decoding, performed by a video decoding core, a sequence of layers of a video from a data stream using intra-layer prediction, each layer representing depth or texture of a respective one of a plurality of views, the video decoding core supporting, for layers representing texture, inter-view texture prediction from layers representing texture of a different view and depth-to-texture prediction from layers representing depth, reading a first parameter set from the data stream, the first parameter set relating to a temporal portion of the video, and derive therefrom, for a current picture of a current layer which represents texture, the timestamp of which is comprised within the temporal portion, a texture reference layer set of layers representing texture and a depth reference layer set of layers relating to depth, reading a second parameter set from the data stream, the second parameter set relating to a portion of the current picture or a portion of the current picture, and derive therefrom, for a current coding unit of the current picture, a selected texture reference layer set of layers representing texture from the texture reference layer set, each layer of the selected texture reference layer set comprising a picture at the current picture's timestamp, and, on the basis of the selected texture reference layer set, an intersection of a potentially available set of layers representing depth of views the texture of which is represented by any of the selected texture reference layer set, on the one hand and the depth reference layer set, on the other hand, reading, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video decoding core depending on the flags for the layers of the intersection applies or not applies depth-to-texture prediction using one or more of the layers of the intersection as depth-to-texture prediction reference for the current coding unit, when said computer program is run by a computer.

46. A non-transitory digital storage medium having a computer program stored thereon to perform the method for 3D video encoding, the method comprising encoding, performed by a video encoding core, a sequence of layers of a video into a data stream using intra-layer prediction, each layer representing depth or texture of a respective one of a plurality of views, the video encoding core supporting, for layers representing texture, inter-view texture prediction from layers representing texture of a different view and depth-to-texture prediction from layers representing depth, inserting a first parameter set into the data stream, the first parameter set relating to a temporal portion of the video, and indicating, for a current picture of a current layer which represents texture, the timestamp of which is comprised within the temporal portion, a texture reference layer set of layers representing texture and a depth reference layer set of layers relating to depth, inserting a second parameter set from the data stream, the second parameter set relating to a portion of the current picture or a portion of the current picture, and indicating, for a current coding unit of the current picture, a selected texture reference layer set of layers representing texture from the texture reference layer set, each layer of the selected texture reference layer set comprising a picture at the current picture's timestamp, deriving an intersection of a potentially available set of layers representing depth of views the texture of which is represented by any of the selected texture reference layer set, on the one hand and the depth reference layer set, on the other hand, inserting, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video encoding core, depending on whether the depth-to-texture prediction using the layers of the intersection as depth-to-texture prediction reference is enabled or disabled for the current coding unit, applies or not applies depth-to-texture prediction using the layers of the intersection as depth-to-texture prediction reference for the current coding unit, when said computer program is run by a computer.

47. Digital storage medium having stored thereon a data stream generated by a method for 3D video encoding, the method comprising encoding, performed by a video encoding core, a sequence of layers of a video into a data stream using intra-layer prediction, each layer representing depth or texture of a respective one of a plurality of views, the video encoding core supporting, for layers representing texture, inter-view texture prediction from layers representing texture of a different view and depth-to-texture prediction from layers representing depth, inserting a first parameter set into the data stream, the first parameter set relating to a temporal portion of the video, and indicating, for a current picture of a current layer which represents texture, the timestamp of which is comprised within the temporal portion, a texture reference layer set of layers representing texture and a depth reference layer set of layers relating to depth, inserting a second parameter set from the data stream, the second parameter set relating to a portion of the current picture or a portion of the current picture, and indicating, for a current coding unit of the current picture, a selected texture reference layer set of layers representing texture from the texture reference layer set, each layer of the selected texture reference layer set comprising a picture at the current picture's timestamp, deriving an intersection of a potentially available set of layers representing depth of views the texture of which is represented by any of the selected texture reference layer set, on the one hand and the depth reference layer set, on the other hand, inserting, per layer of the intersection, a flag from the data stream, the flag relating, at least, to the current coding unit and indicating whether the depth-to-texture prediction using the respective layer as depth-to-texture prediction reference is enabled or disabled for the current coding unit, and wherein the video encoding core, depending on whether the depth-to-texture prediction using the layers of the intersection as depth-to-texture prediction reference is enabled or disabled for the current coding unit, applies or not applies depth-to-texture prediction using the layers of the intersection as depth-to-texture prediction reference for the current coding unit.

* * * * *